(12) United States Patent
Nishikawa et al.

(10) Patent No.: US 6,246,438 B1
(45) Date of Patent: Jun. 12, 2001

(54) IMAGE CODED DATA RE-ENCODING APPARATUS WITHOUT ONCE DECODING THE ORIGINAL IMAGE CODED DATA

(75) Inventors: Hirofumi Nishikawa; Kohtaro Asai; Tokumichi Murakami, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/351,283

(22) Filed: Jul. 12, 1999

Related U.S. Application Data

(62) Division of application No. 08/806,237, filed on Feb. 24, 1997.

(30) Foreign Application Priority Data

Aug. 5, 1996 (JP) .................................... 8-206226

(51) Int. Cl.[7] .................................................. H04N 7/12
(52) U.S. Cl. ........................................... 348/401; 348/404
(58) Field of Search ............................... 348/405, 13–17, 348/384, 390, 403, 404, 409, 699, 400, 401; 395/200.62; H04N 7/12

(56) References Cited

U.S. PATENT DOCUMENTS

| | | |
|---|---|---|
| 5,489,944 | 2/1996 | Jo . |
| 5,537,440 | 7/1996 | Eyuboglu et al. . |
| 5,541,852 | 7/1996 | Eyuboglu et al. . |
| 5,568,184 | 10/1996 | Shibata et al. . |
| 5,831,688 | 11/1998 | Yamada et al. . |

FOREIGN PATENT DOCUMENTS

| | | |
|---|---|---|
| 20529 95 | 5/1996 | (AU) . |
| 0509576 A2 | 10/1992 | (EP) . |
| 0618734 A2 | 10/1994 | (EP) . |
| 0687112 A2 | 12/1995 | (EP) . |
| 0710030 A1 | 5/1996 | (EP) . |
| 2-179186 | 7/1990 | (JP) . |
| 7-336681 | 12/1995 | (JP) . |
| 96/23388 | 8/1996 | (WO) . |

*Primary Examiner*—Young Lee

(57) ABSTRACT

An image coded data re-encoding apparatus (30) which generates in an image coded data analyzer (310) coded data after signal processing (221) by performing a first digital signal processing on first image coded data (220), supplies an image coded data synthesizer (320) with the coded data after signal processing (221) and multiple signals (222) associated with the first image coded data, and generates in the image coded data synthesizer (320) a second image coded data (240) by performing on the coded data after signal processing (221) a second digital signal processing based on multiple signals (222). The second image coded data is generated without once decoding the first image coded data. This makes it possible to prevent degradation in image quality, delay involved in the transform and an increase of the device size.

1 Claim, 16 Drawing Sheets

IMAGE CODED DATA RE-ENCODING APPARATUS WITHOUT ONCE DECODING THE ORIGINAL IMAGE CODED DATA

This application is a divisional of application Ser. No. 08/806,237 filed on Feb. 24, 1997, the entire contents of which are hereby incorporated by reference.

BACKGROUND OF THE INVENTION

1. Field of the Invention

The present invention relates to an image coded data re-encoding apparatus for producing a second image coded data by applying digital signal processing to a first image coded data which is obtained by coding a digital input image signal.

2. Description of Related Art

FIG. 16 is a block diagram showing a conventional image coded data re-encoding apparatus disclosed in Japanese patent application laid-open No. 2-179186/1990, for example. It is an example of a multiple site video conference system. In this figure, the reference numeral 1 designates a master station, 2 designates a relay station, 3 designates a slave station, 10 designates an image coder of the stations, and 20 designates an image decoder. The reference numerals 101 designates an input image, 102 designates image coded data, 103 designates a decoded image signal, 104 designates image re-encoded data, and 105 designates a decoded image signal.

The operation will now be described.

The image coder 10 of the master station 1 performs coding of the input image 101, and sends the image coded data 102 to the relay station 2. The relay station 2 receives the image coded data 102 with its image decoder 20 to decode it, and generates the image re-encoded data 104 by re-encoding the decoded image signal 103 with the image coder 10. The image re-encoded data 104 thus generated by the re-encoding is transmitted to the slave station 3. The slave station 3 decodes with the image decoder 20 the image re-encoded data 104 which is relayed through the relay station 2, and uses it as the decoded image signal 105.

When holding a conference using the relay station 2 with such a decoding and relaying function, it often occurs that the master station 1 and the slave station 3 employ different coding systems. In this case, it becomes necessary to change the amount of coded data to be generated and various types of parameters such as image size and a frame rate. Thus, the relay station 2 once decodes the received image coded data 102 into the decoded image signal 103, and then re-encodes it into the image re-encoded data 104, thereby matching the different coding systems.

In this way, the conventional image coded data re-encoding apparatus has a process through which the image coded data is once decoded to be re-encoded to achieve relaying or copying of the image coded data.

Since the conventional image coded data re-encoding apparatus with such an arrangement once decodes the image coded data 102 into the decoded image signal 103, and then re-encodes the decoded image signal 103 regardless of its contents to relay or convert the image coded data 102, it has some problems such as degrading the image quality of the decoded image signal 105, increasing a delay involved in the relay and transform, and augmenting the size of the apparatus.

SUMMARY OF THE INVENTION

The present invention is accomplished to solve such problems, and to provide an image coded data re-encoding apparatus which can reduce the image degradation, shorten the processing delay, and shrink the device size, thereby achieving an efficient transform of the image coded data.

According to one aspect of the present invention, there is provided an image coded data re-encoding apparatus comprising: an image coded data analyzer for generating coded data after signal processing by performing a first digital signal processing on a first image coded data; and an image coded data synthesizer for generating a second image coded data by performing on the coded data after signal processing a second digital signal processing based on multiple signals associated with a first image coded data by using the coded data after signal processing output from the image coded data analyzer and the multiple signals.

This will offer an advantage of reducing the degradation of the image quality after the transform, decreasing processing delay, and achieving an image coded data re-encoding apparatus with a reduced size in comparison with a system in which the first image coded data is always once decoded into a decoded image, followed by re-encoding of the decoded image into the second image coded data regardless of the decoded data.

In image coded data re-encoding apparatus, the image coded data analyzer may extract the multiple signals in the course of generating the coded data after signal processing by performing the first digital signal processing on the first image coded data, and may provides the image coded data synthesizer with the coded data after signal processing.

This will offer an advantage of providing an information effective image coded data re-encoding apparatus capable of obviating special additional information which was needed for the second digital signal processing for generating the second image coded data.

In the image coded data re-encoding apparatus, the image coded data re-encoding apparatus may further comprise a separator for separating from the first image coded data the multiple signals which have been externally combined with the first image coded data and cannot be extracted from the first image coded data in the first digital signal processing for generating the coded data after signal processing, and the image coded data synthesizer may generate the second image coded data by using the multiple signals output from the separator.

This will offer an advantage of providing a coded data re-encoding apparatus which can use, in the second digital signal processing for generating the second image coded data, information which cannot be extracted in course of the first digital signal processing, and this will make possible more effective transform than when such information is not used.

The image coded data re-encoding apparatus may further comprise an information extractor/estimator for extracting or estimating the multiple signals needed for the second digital signal processing from the coded data after signal processing generated by the image coded data analyzer, and the image coded data synthesizer may generate the second image coded data by using the multiple signals output from the information extractor/estimator.

This will offer an advantage of providing an image coded data re-encoding apparatus with a simple configuration because it obviates special processing involved in decoding.

In the image coded data re-encoding apparatus, the image coded data synthesizer may generate the second image coded data with a data amount different from a data amount of the first image coded data input to the image coded data analyzer.

This will offer an advantage of providing an image coded data re-encoding apparatus which can perform transformation between data of different amounts with reduced image degradation and processing delay.

The image coded data re-encoding apparatus may further comprise a coefficient deletion/addition/correction portion for deleting part of the transform coefficients or quantization indices, which are extracted by the image coded data analyzer, and for correcting the transform coefficients or quantization indices in accordance with a ratio of amounts of data to be transformed.

This will offer an advantage that the amount of data can be reduced because part of the transform coefficients or the quantization indices is deleted, and that the image quality of the decoded image can be improved as compared with a system which simply thins out the transform coefficients or quantization indices because the remainder of the transform coefficients or the quantization indices is corrected in accordance with the ratio of amounts of data to be transformed.

The image coded data re-encoding apparatus may further comprise a coefficient deletion/addition/correction portion for deleting part of the transform coefficients or quantization indices, which are extracted by the image coded data analyzer, and are weighted in accordance with relationships between the transform coefficients or quantization indices and their neighboring transform coefficients or quantization indices.

This will offer an advantage that the amount of data can be reduced, and the image quality of the decoded image can be improved as compared with a system which simply thins out the transform coefficients or quantization indices.

The image coded data re-encoding apparatus may further comprise a coefficient deletion/addition/correction portion for adding, to the transform coefficients or quantization indices which are extracted in the image coded data analyzer, new transform coefficients or quantization indices after correcting the new transform coefficients or quantization indices in accordance with a ratio of amounts of data to be transformed.

This will offer an advantage of achieving transform with improved image quality as compared with a system which simply adds the transform coefficients or quantization indices because the newly added transform coefficients or quantization indices are corrected in accordance with the ratio of amounts of data to be transformed, and hence the data amount of the additional data can be adjusted considering the image quality after inverse transform.

The image coded data re-encoding apparatus may further comprise a coefficient deletion/addition/correction portion for adding, to the transform coefficients or quantization indices which are extracted in the image coded data analyzer, new transform coefficients or quantization indices after predicting transform coefficients or quantization indices including the new transform coefficients or quantization indices and their neighboring transform coefficients or quantization indices.

This will offer an advantage of achieving transform with improved image quality, providing clearer images than a system which simply adds the transform coefficients or quantization indices, because such prediction is carried out as improving the decoded image quality in adding the transform coefficients or quantization indices.

The image coded data re-encoding apparatus may further comprise a coefficient deletion/addition/correction portion for increasing a ratio of deletion of the transform coefficients or quantization indices, which are extracted by the image coded data analyzer, if the coding parameter designating the picture type indicates, when a decision is made whether or not the current image to be processed is used for prediction in future coding, that the picture type is not used for the prediction in the future coding.

This will offer an advantage of achieving high quality transform which can maintain the total image quality on the time axis because when a frame of unit time length is not used for the coding in the next unit time, only the data amount associated with the frame can be reduced.

The image coded data re-encoding apparatus may further comprise a coefficient deletion/addition/correction portion for decreasing a ratio of deletion of the transform coefficients or quantization indices, which are extracted by the image coded data analyzer, if the coding parameter designating the picture type indicates, when a decision is made whether or not the current image to be processed is used for prediction in future coding, that the picture type is used for the prediction in the future coding.

This will offer an advantage of achieving high quality transform which can maintain the total image quality on the time axis because when a frame of unit time length is used for the coding in the next unit time, the reduction ratio of the data in the frame is decreased.

The image coded data re-encoding apparatus may further comprise a coefficient deletion/addition/correction portion for increasing a ratio of deletion of the transform coefficients or quantization indices, which are extracted by the image coded data analyzer, if the coding parameter designating the predictive type of the image block indicates, when a decision is made whether a current image to be processed is used for prediction in future coding by using the coding parameters generated by the image coded data analyzer, that the image block is not used for the prediction in the future coding, even if the coding parameter designating the picture type indicates that the picture type is used for the prediction in the future coding.

This will offer an advantage of achieving transform with improved image quality on the time axis because the decision is made of an increase of the deletion ratio of the transform coefficients or the quantization indices by using the coded block information in addition to the coded picture information, and hence finer control becomes possible.

In the image coded data re-encoding apparatus, the image coded data synthesizer may generate the second image coded data whose decoding procedure differs from a decoding procedure of the first image coded data input to the image coded data analyzer.

This will offer an advantage of providing higher quality image after the transform when generating image coded data between different coding systems.

The image coded data re-encoding apparatus may further comprise a coding parameter corrector/transformer for correcting and transforming the expression form of various types of coding parameters, which are extracted by the image coded data analyzer, from the expression form in the decoding procedure of the first image coded data to an expression form in the decoding procedure of the second image coded data.

This will offer an advantage of providing a small size, inexpensive apparatus because it becomes unnecessary for the first image coded data to be once decoded into an image and then re-encoded in accordance with the coding system, even when the first image coded data input to the image coded data analyzer has a different coding system from the second coded data output from the image coded data synthesizer.

In the image coded data re-encoding apparatus, the image coded data synthesizer may generate the second image coded data including an image signal whose image size differs in time or space from an image size of an image signal included in the first image coded data input to the image coded data analyzer.

This will offer an advantage of providing an image coded data re-encoding apparatus which facilitates the transform between the different image sizes in time or space, thereby achieving high quality image after the transform.

The image coded data re-encoding apparatus, may further comprise a coefficient deletion/addition/correction portion for changing an amount of the transform coefficients or quantization indices extracted by the image coded data analyzer, and for correcting the transform coefficients or quantization indices, which are extracted by the image coded data analyzer, in accordance with a ratio of the image sizes to be transformed.

This will offer an advantage of reducing the degradation of the image quality after the change in the image size by suppressing sharp degradation in the resolution or unnaturalness of the image, because the transform coefficients or the quantization indices are corrected in accordance with the image sizes to be varied in the coded data transform involving the image size change.

The image coded data re-encoding apparatus may further comprise a coefficient deletion/addition/correction portion for correcting dimension of the motion vectors extracted by the image coded data analyzer in accordance with a ratio of the image sizes to be transformed.

This will offer an advantage that a characteristic is obtained, which substantially matches the characteristic obtained in a wider motion compensative search range, by a narrower range motion compensative search, because of the improved motion compensation efficiency in the image coded data after the transform since the dimension of the motion vectors are corrected in accordance with the ratio of the image sizes to be changed.

In the image coded data re-encoding apparatus, the image coded data synthesizer may generates the second image coded data including an image signal whose sequence differs from a sequence of an image signal included in the first image coded data input to the image coded data analyzer.

This will offer an advantage of providing an image coded data re-encoding apparatus that can achieve transform between image coded data whose image signal sequences are different, thereby achieving high image quality after the transform.

The image coded data re-encoding apparatus may further comprise a motion searcher for estimating dimension of the motion vectors extracted by the image coded data analyzer in accordance with the sequence of the image signals to be transformed.

This will offer an advantage of improving the efficiency of coding using the motion vectors after the transform by estimating the dimension of the motion vectors in accordance with the sequences of the images to be transformed.

In the image coded data re-encoding apparatus, the image coded data synthesizer may generate the second image coded data whose decoded image signal includes a number of frames per unit time different from a number of frames per unit time of a decoded image signal of the first image coded data input to the image coded data analyzer.

This will offer an advantage of providing an image coded data re-encoding apparatus capable of implementing the transform into the image coded data whose number of image frames differs from that of the decoded image signal, thereby achieving high image quality after the transform.

The image coded data re-encoding apparatus may further comprise a quantization estimator for estimating, from the decoded image output from the image coded data analyzer, quantization parameters obtained in the course of generating the first image coded data, and the image coded data synthesizer may generate the second image coded data by using the quantization parameters estimated by the quantization estimator.

This is effective when the image coded data analyzer carries out operation matching a common decoding operation, and will offer an advantage of providing an image coded data re-encoding apparatus capable of maintaining the image quality after the transform in such application as relay transmission because the estimation of the quantization indices from the decoded image makes it possible to improve the image quality of the second image coded data. In addition, it offers an advantage of implementing an optimum transform by controlling the quantization parameters in accordance with the ratio of data rates before and after the transform. In particular, the best image quality can be achieved when the rates are identical before and after the transform.

DETAILED DESCRIPTION OF THE PREFERRED EMBODIMENTS

The invention will now be described with reference to the accompanying drawings.

Embodiment 1

Figure 1:
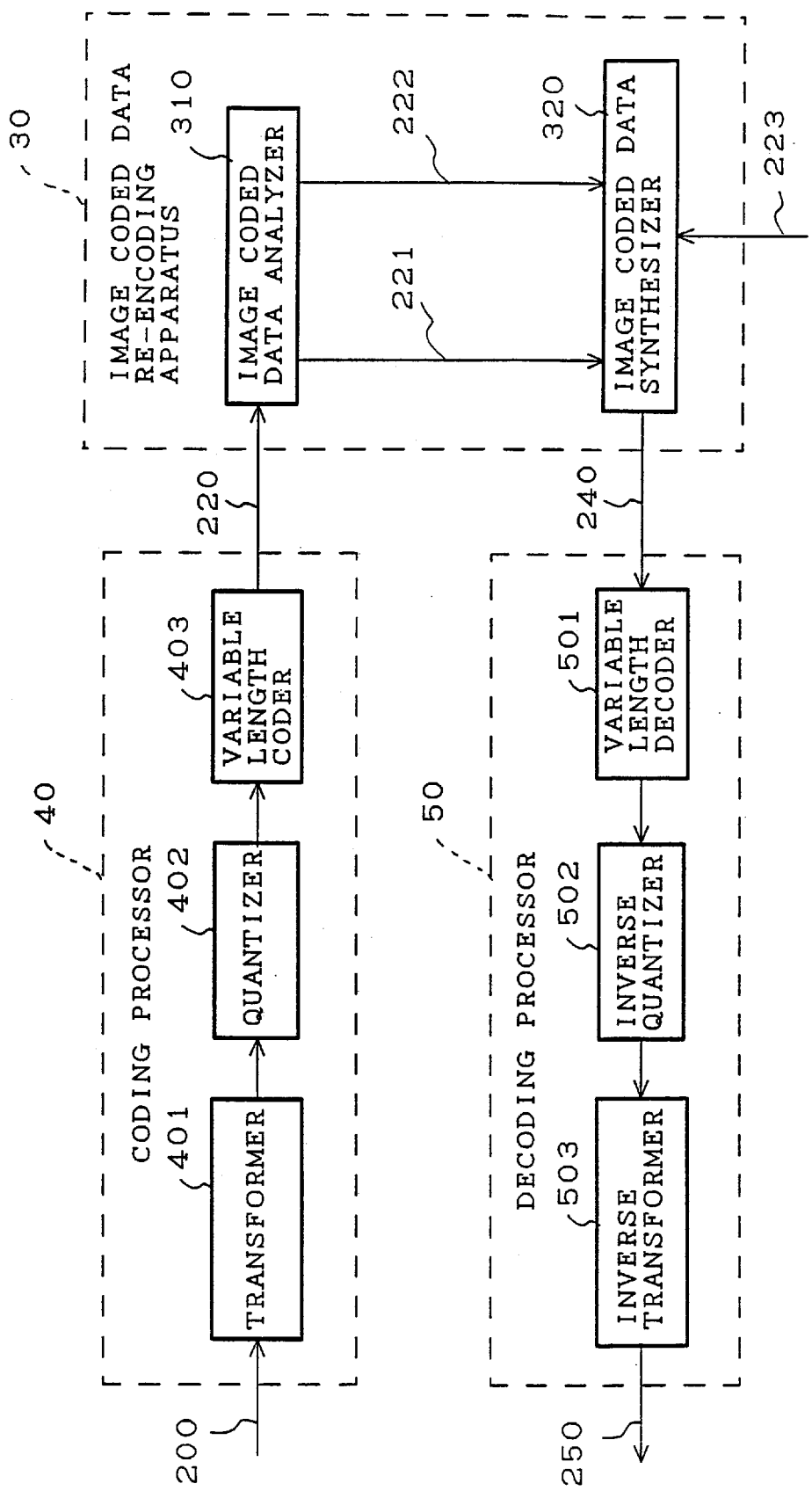
FIG. 1 is a block diagram showing a first embodiment of an image coded data re-encoding apparatus in accordance with the present invention.

FIG. 1 is a block diagram showing a first embodiment of an image coded data re-encoding apparatus in accordance with the present invention, together with a coding processor and a decoding processor, wherein the coding processor codes an input image signal to be subjected to the digital signal processing in the image coded data re-encoding apparatus, and the decoding processor decodes the image coded data processed in the image coded data re-encoding apparatus. In this figure, the reference numeral 30 designates an image coded data re-encoding apparatus, 40 designates a coding processor, and 50 designates a decoding processor. The reference numeral 200 designates a digital input image signal supplied to the coding processor 40, 220 designates a first image coded data obtained by coding the input image signal 200 by the coding processor 40, 240 designates a second image coded data obtained by applying digital signal processing to the first image coded data 220 in the image coded data re-encoding apparatus 30, and 250 designates a decoded image signal obtained by decoding the second image coded data 240 in the decoding processor 50.

In the image coded data re-encoding apparatus 30, the reference numeral 310 designates an image coded data analyzer, and 320 designates an image coded data synthesizer. The image coded data analyzer 310 performs a first digital signal processing on the first image coded data 220 fed from the coding processor 40. The image coded data synthesizer 320 receives the coded data after the signal processing output from the image coded data analyzer 310 together with multiple signals associated with the first image coded data, and performs a second digital signal processing on the coded data after the signal processing on the basis of the multiple signals, thereby generating a second image coded data 240. The reference numeral 221 designates the coded data after signal processing, which is transferred from the image coded data analyzer 310 to the image coded data synthesizer 320, and 222 designates the multiple signals associated with the first image coded data 220, which are also transferred from the image coded data analyzer 310 to the image coded data synthesizer 320. The reference numeral 223 designates information for instructing a data amount and an image size to be transformed, which is input to the image coded data synthesizer 320.

In the coding processor 40, the reference numeral 401 designates a transformer, 402 designates a quantizer, and 403 designates a variable length coder. The transformer 401 carries out operations such as discrete cosine transform (called DCT below) to generate transform coefficients from the input image signal 200. The quantizer 402 generates quantization indices by applying a scalar quantization processing to the transform coefficients generated by the transformer 401. The variable length coder 403 performs variable length coding on the quantization indices generated by the quantizer 402 by using Huffman codes or the like.

In the decoding processor 50, the reference numeral 501 designates a variable length decoder, 502 designates an inverse quantizer, and 503 designates an inverse transformer. The variable length decoder 501 applies the variable length decoding to the second image coded data 240. The inverse quantizer 502 performs inverse scalar quantization processing on the quantization indices decoded by the variable length decoder 501. The inverse transformer 503 performs the inverse DCT on the transform coefficients generated by the inverse quantization by the inverse quantizer 502 to obtain the decoded image signal 250. In the coding processor 40 and decoding processor 50, only blocks are shown for implementing basic functions.

Next, the operation will be described.

The digital input image signal 200 is input to the coding processor 40 comprising the transformer 401, quantizer 402 and variable length coder 403 to be coded into the first image coded data 220. The operation of the coding processor 40 will be described below.

Figure 2:
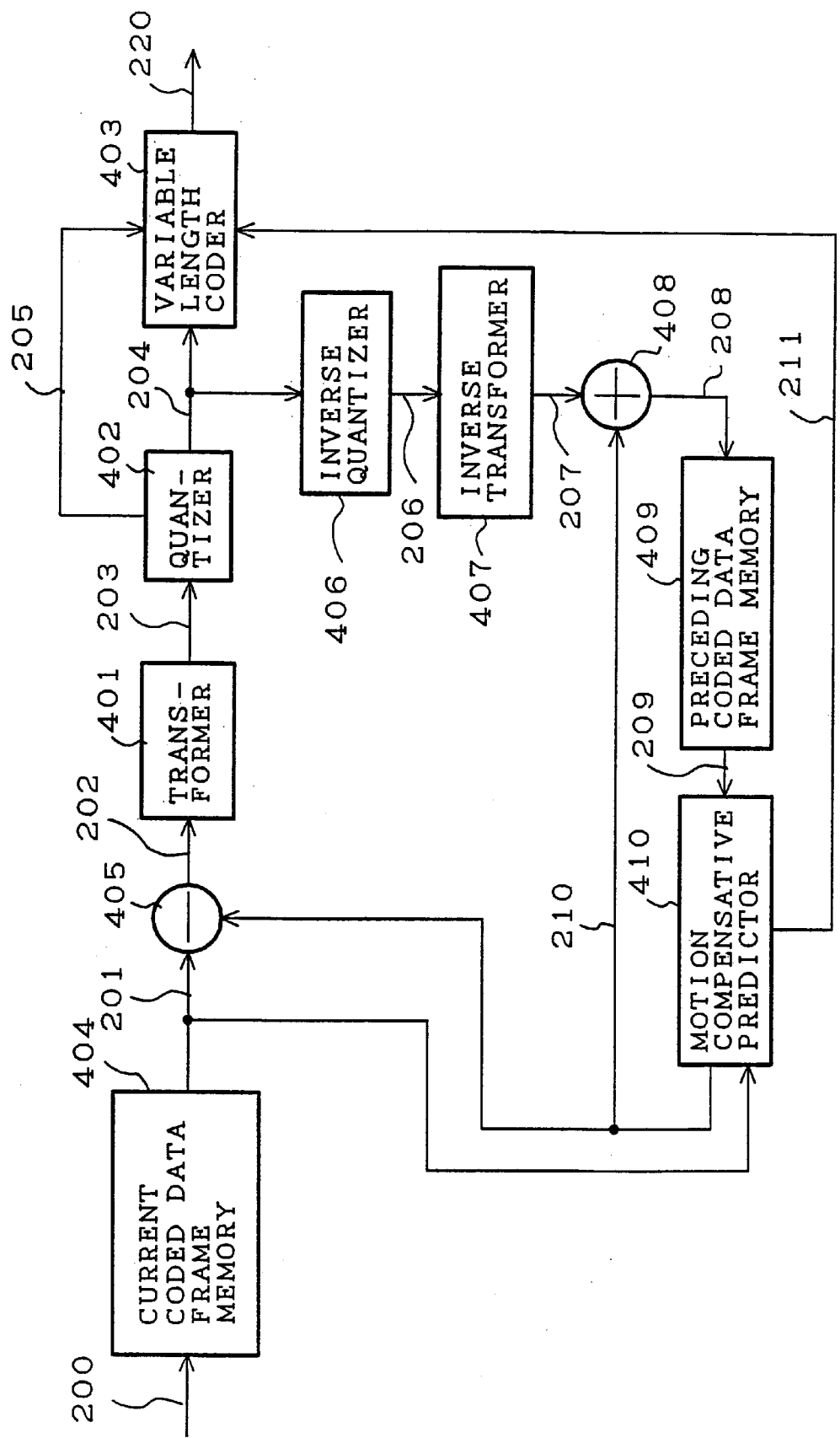
FIG. 2 is a block diagram showing a coding processor in the first embodiment.

FIG. 2 is a block diagram showing a concrete configuration of the coding processor 40 to describe its operation. It includes the transformer 401, quantizer 402 and variable length coder 403 for implementing the basic function for coding the input image signal 200 into the first image coded data 220, together with an additional portion for implementing a motion compensative prediction. In this figure, the reference numeral 404 designates a current coded data frame memory for storing the input image signal 200, and 405 designates a subtracter for subtracting a predicted frame image 210 from a current frame image 201 read out of the current coded data frame memory 404, thereby generating a prediction error frame image 202. The predicted frame image 210 is fed from a motion compensative predictor which will be described later. The reference numeral 203 designates the transform coefficients output from the transformer 401 as a result of the DCT of the prediction error frame image 202 by the transformer 401. The reference numerals 204 and 205 designate the quantization indices and quantization parameters, respectively, which are generated by the scalar quantization of the transform coefficients 203 by the quantizer 402 and supplied to the variable length coder 403. The reference numeral 406 designates an inverse quantizer for carrying out the inverse quantization of the quantization indices 204 output from the quantizer 402, 407 designates an inverse transformer for performing inverse transform (inverse DCT) on transform coefficients 206 which is obtained by the inverse quantization by the inverse quantizer 406, and 408 designates an adder for adding a local prediction error frame image 207, which is generated by the inverse transform by the inverse transformer 407, to the predicted frame image 210 from the motion compensative predictor. The reference numeral 409 designates a preceding coded data frame memory for storing a local decoded frame image 208 obtained as a result of addition by the adder 408, and 410 designates a motion compensative predictor for generating a predicted frame image 210 delivered to the subtracter 405 and the adder 408, and motion vectors 211 supplied to the variable length coder 403, on the basis of a preceding frame image 209 read out of the preceding coded data frame memory 409 and the current frame image 201 read out of the current coded data frame memory 404. The variable length coder 403 generates the first image coded data 220 using the motion vectors 211, the quantization parameters 205 from the quantizer 402, and the quantization indices 204 from the quantizer 402.

The coding processor 40 with the configuration as shown in FIG. 2 operates as follows in accordance with the MPEG 1 (Moving Picture Expert Group 1) standard proposed by the joint conference of ISO (International Organization for Standardization) and IEC (International Electrotechnical Commission). First, the digital input image signal 200 is stored in the current coded data frame memory 404, and the current frame image 201 to be coded which is read out of the current coded data frame memory 404 is input to the subtracter 405. The subtracter 405 subtracts from the input signal the predicted frame image 210 fed from the motion compensative predictor 410, thereby generating the prediction error frame image 202. Subsequently, the transformer 401 transforms the prediction error frame image 202 using the DCT to generate the transform coefficients 203. The quantizer 402 performs the scalar quantization processing in accordance with quantization steps using feedback control which monitors the amount of generated codes with reference to the transform coefficients 203 to keep that amount constant, or using feed forward control based on the detected variance of the input image signal 200, thereby generating the quantization indices 204. The variable length coder 403 performs the variable length coding on the quantization indices 204 using the Huffman codes together with the quantization parameters 205 generated by the quantizer 402 and the motion vectors 211 generated by the motion compensative predictor 410, thus generating the first image coded data 220. The first image coded data 220 is transmitted through a communication channel, or stored in a storage medium such as CD ROM (compact disk memory) or video tape.

The inverse quantizer 406 performs inverse quantization of the quantization indices 204 generated by the quantizer 402, and outputs the transform coefficients 206. The inverse transformer 407 carries out on the transform coefficients 206 the inverse transform using the inverse DCT to generate the local prediction error frame image 207 fed to the adder 408. The adder 408 adds the local prediction error frame image 207 to the predicted frame image 210 fed from the motion compensative predictor 410 to generate the local decoded frame image 208 which is stored in the preceding coded data frame memory 409. Subsequently, the motion compensative predictor 410 performs pattern matching of the coded preceding frame image 209 read out of the preceding coded data frame memory 409 with the current frame image 201 read out of the current coded data frame memory 404 to generate the motion compensated predicted frame image 210 which provides minimum error, and supplies it to the subtracter 405 and the adder 408.

Figure 3:
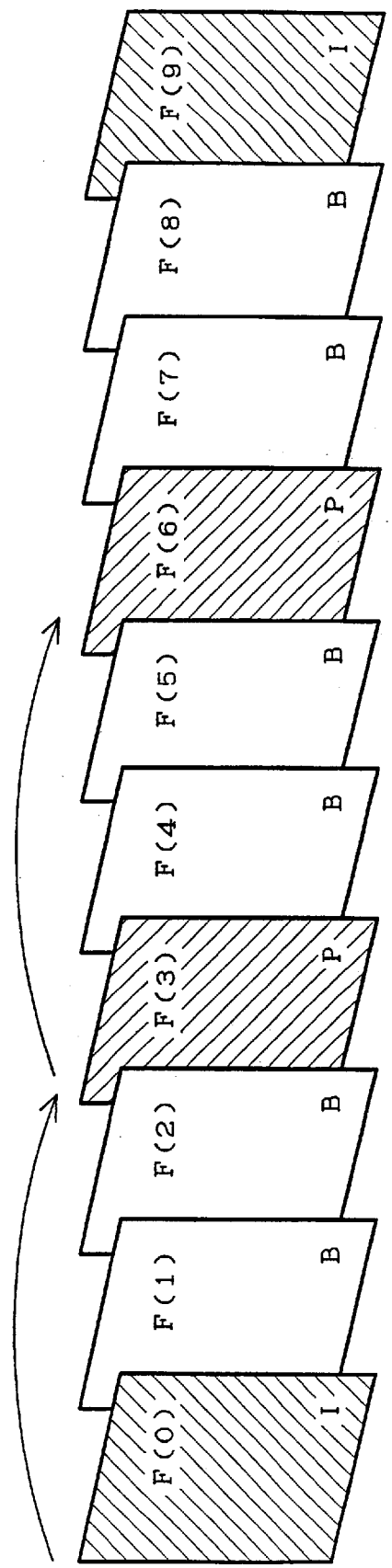
FIG. 3 is a schematic diagram illustrating a coding mode in the coding processor.

In the MPEG 1 motion compensative prediction, there are three types of coding modes as shown in FIG. 3: an intra-frame coding mode (I-Picture); a forward motion compensative inter-frame predictive coding mode (P-Picture); and a bidirectional motion compensative inter-frame predictive coding mode (B-Picture). With regard to I pictures (intra-frame coding mode frame images) F(0) and F(9), the motion compensative prediction is not carried out, that is, the predicted frame image 210 is not generated. Since I pictures are used as a reference image for the motion compensative prediction, a high quality decoded image is required of the I pictures. The amount of codes, on the other hand, considerably increases because the motion compensative prediction is not performed. With regard to P pictures (forward motion compensative inter-frame predictive coding mode frame images) F(3) and F(6), the motion compensative prediction is carried out using only a preceding image, such as F(0) for F(3), F(3) for F(6). Since the P pictures are occasionally used as the reference image of the motion compensative prediction, their quality must be kept at a certain degree. With regard to B pictures (bidirectional motion compensative inter-frame predictive coding mode frame images) F(1) and F(2), F(4) and F(5), and F(7) and F(8), the motion compensative prediction is performed using two images, preceding and following ones. Since the B pictures are not used as the reference image of the motion compensative prediction, rough quantization is possible. The bidirectional motion compensative prediction can reduce the code amount because the decoded images can be obtained only from the motion vectors if the preceding and following I pictures and P pictures have high quality in a stream of motion sequences.

When the current coded data frame memory 404 takes the coding mode as shown in FIG. 3, it outputs the frame images in the order of F(0)-F(3)-F(1)-F(2)-F(6)-F(4)-F(5)-F(9)-F(7)-F(8).

The image coded data re-encoding apparatus 30 generates the second image coded data 240 from the first image coded data 220 the coding processor 40 has generated by applying the coding on the input image signal 200 by transforming at least one of the "volume of the coded data", "size of the coded image", "coding systems" and "sequence of the images". Specifically, the image coded data analyzer 310 receives the first image coded data 220 from the coding processor 40, and analyzes the data to generate the coded data after signal processing 221 after the coding. In addition, it extracts the multiple signals 222 associated with the first image coded data in the process of generating the coded data after signal processing 221, thereby outputting the multiple signals. Subsequently, the image coded data synthesizer 320 generates the second image coded data 240 from the coded data after signal processing 221 and the multiple signals 222 associated with the first image coded data, and outputs it to the decoding processor 50. Thus, the image coded data synthesizer 320 is paired with the image coded data analyzer 310. Considering the image coded data analyzer 310 as an integral part of an image decoder, which carries out the decoding of the first image coded data 220 halfway, the image coded data synthesizer 320 can be considered as an integral part of an image coder, which performs the re-encoding of the coded data after signal processing 221 which has been decoded halfway by the image coded data analyzer 310.

This will be described in more detail with reference to the drawings.

The image coded data analyzer 310 of the image coded data re-encoding apparatus 30 receives the first image coded data 220 20 which is obtained by coding in the coding processor 40 the digital input image signal 200 like a digital motion image signal. The image coded data analyzer 310 has a function to perform the variable length decoding of the first image coded data 220, and a function to carry out the inverse quantization of the decoded quantization indices, and analyzes the first image coded data 220 when it is input. Specifically, it carries out a first digital signal processing on the input first image coded data 220 by using the variable length decoding and inverse quantization functions, thereby supplying the image coded data synthesizer 320 with results of the first digital signal processing, that is, the coded data after signal processing 221 and the multiple signals 222 associated with the first image coded data, which has been extracted from the first image coded data 220 during the first digital signal processing.

On the other hand, the image coded data synthesizer 320 has a function to perform on the coded data after signal processing 221 fed from the image coded data analyzer 310 a coefficient correction that deletes, adds, or corrects the transform coefficients of the coded data after signal processing 221. The image coded data synthesizer 320 has another function to quantize the data which has undergone the coefficient correction, and still another function to perform the variable length coding of the quantization indices. The image coded data synthesizer 320, receiving the coded data after signal processing 221, the multiple signals 222 associated with the first image coded data, and the information 223 instructing the transform, carries out the synthesis of the coded data by using the functions such as the coefficient correction, quantization and variable length coding. Specifically, it performs a second digital signal processing of the coded data after signal processing 221 based on the multiple signals 222 associated with the first image coded data and the information 223 instructing the transform, thereby generating the second image coded data 240 as a result of the second digital signal processing. In this process, the multiple signals 222 associated with the first image coded data, which is extracted from the first image coded data 220 during the first digital signal processing by the image coded data analyzer 310, is used when the first image coded data 220 is transformed, without being decoded to an image, to the second image coded data 240. The second image coded data 240 thus generated is transmitted through a communication channel, or recorded on a storage medium such as a CD-ROM, or a video tape, to be supplied to the decoding processor 50.

The second image coded data 240 as transmitted/recorded information, which has been transmitted through the communication channel or recorded on the storage medium such as CD-ROM or video tape, is decoded by the decoding processor 50 to be output as the decoded image signal 250. In other words, the decoding processor 50 provides an inverse process of the coding processor 40.

Figure 4:
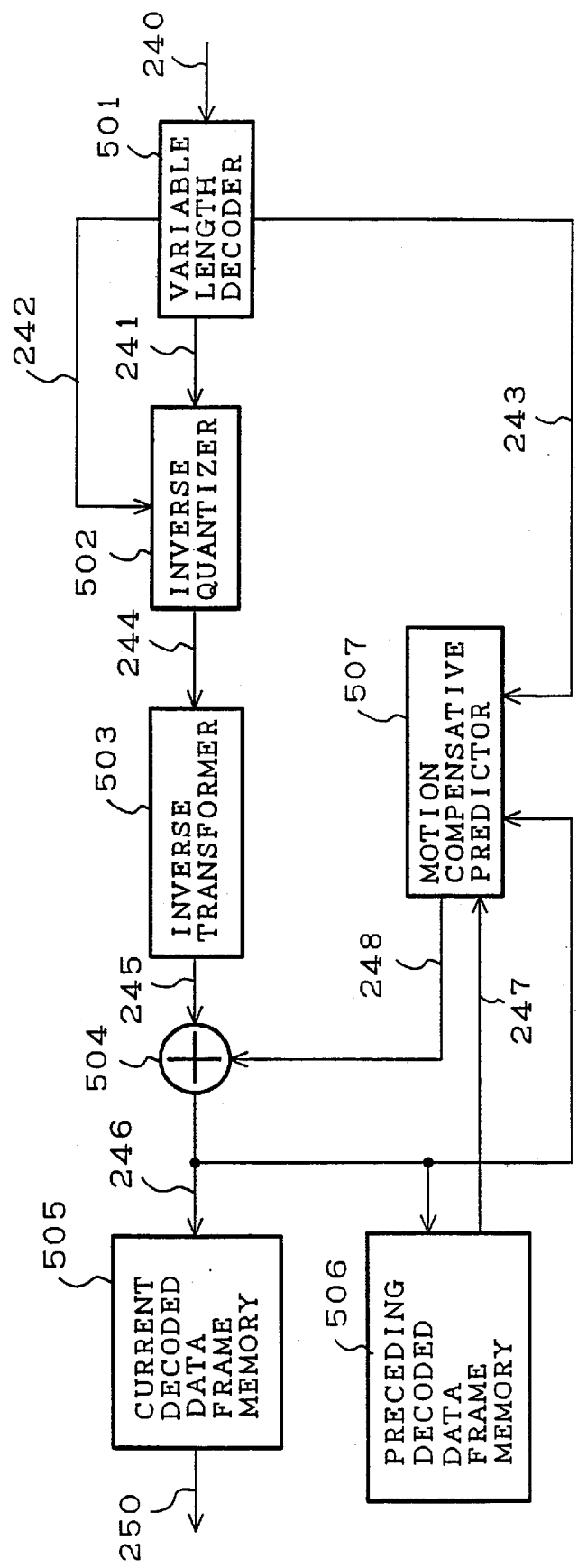
FIG. 4 is a block diagram showing a decoding processor in the first embodiment.

FIG. 4 is a block diagram illustrating a concrete configuration of the decoding processor 50 to explain its operation. In this figure, the variable length decoder 501, inverse quantizer 502 and inverse transformer 503 function as an inverse transformer which implements the basic function for decoding the second image coded data 240 into the decoded image signal 250. The remaining portion is added to implement motion compensative prediction. In FIG. 4, the reference numerals 241, 242 and 243 designate quantization indices, quantization parameters, and decoded motion vectors, respectively, all of which are obtained by the variable length decoding of the second image coded data 240 by the variable length decoder 501. The reference numeral 244 designates transform coefficients generated by the inverse quantization of the quantization indices 241 by the inverse quantizer 502, and 245 designates a prediction error frame image generated by the inverse DCT of the transform coefficients 244 by the inverse transformer 503. The reference numeral 504 designates an adder for adding the prediction error frame image 245 to a predicted frame image 248 fed from the motion compensative predictor described later, and 246 designates a current frame image output from the adder 504.

The reference numeral 505 designates a current decoded data frame memory, into which the current frame image 246 is stored, and from which the current frame image 246 is read as a decoded image signal 250. The reference numeral 506 designates a preceding decoded data frame memory, into which the current frame image 246 is stored, and from which it is read in the next cycle as a preceding frame image 247. The reference numeral 507 designates a motion compensative predictor for generating a predicted frame image 248, which is supplied to the adder 504, from the preceding frame image 247 and the current frame image 246 on the basis of the decoded motion vectors 243 from the variable length decoder 501.

The variable length decoder 501 of the decoding processor 50 with the arrangement as shown in FIG. 4 receives the second image coded data 240 which has been generated by applying the first and second digital signal processings to the first image coded data 220 in the image coded data re-encoding apparatus 30, and recorded on the storage medium such as the CD-ROM or the video tape. The variable length decoder 501 performs the variable length decoding of the input second image coded data 240 to decode it to the quantization indices 241 and to generate the quantization parameters 242 and decoded motion vectors 243. Subsequently, the inverse quantizer 502 performs the inverse scalar quantization of the quantization indices 241 decoded by the variable length decoder 501 in accordance with the quantization parameters 242 from the variable length decoder 501, thereby obtaining the inverse quantized transform coefficients 244. Then, the inverse transformer 503 carries out the inverse DCT of the transform coefficients 244 which has undergone the inverse quantization in the inverse quantizer 502, thus to generate the prediction error frame image 245. The adder 504 adds the prediction error frame image 245 which has undergone the inverse transform in the inverse transformer 503 to the predicted frame image 248 fed from the motion compensative predictor 507 to generate the current frame image 246 to be decoded. The current frame image 246 is stored in the current decoded data frame memory 505, and is read therefrom as the decoded image signal 250. The current frame image 246 is also stored in the preceding decoded data frame memory 506 so that it is read during the motion compensative prediction in the next cycle as the preceding frame image 247 which has already been decoded, and is supplied to the motion compensative predictor 507. The motion compensative predictor 507 generates in accordance with the decoded motion vectors 243 fed from the variable length decoder 501 the predicted frame image 248 to be supplied to the adder 504 from the preceding frame image 247 which has already been decoded and the current frame image 246 which is output from the adder 504.

Although in the above description, the motion compensative prediction is carried out in the coding processor 40 and the decoding processor 50, the motion compensative prediction may be omitted.

According to the first embodiment, the multiple signals 222 associated with the first image coded data is employed in the second digital signal processing for generating the second image coded data 240, which multiple signals 222 are extracted in the process of applying the first digital signal processing to the first image coded data 220. This makes it unnecessary to add special information for the second digital signal processing, and hence reduces the information amount, resulting in an information efficient apparatus.

Embodiment 2

Although the foregoing embodiment 1 used the multiple signals 222 associated with the first image coded data, which are extracted in the process of applying the first digital signal processing to the first image coded data 220, to generate the second coded data 240 by applying the second digital signal processing to the coded data after signal processing 221, the multiple signals associated with the first image coded data can be obtained by other ways. For example, information which is used for generating the first image coded data 220 by coding the input image signal 200 in the coding processor 40, and which cannot be extracted in the process of applying the first digital signal processing to the first image coded data 220 in the image coded data re-encoding apparatus 30, can be combined with the first image coded data 220 to be fed to the image coded data re-encoding apparatus 30 so that the image coded data re-encoding apparatus 30 separates the information from the first image coded data 220 as the multiple signals associated with the first image coded data which are used for performing the second digital signal processing on the first image coded data 220.

Figure 5:
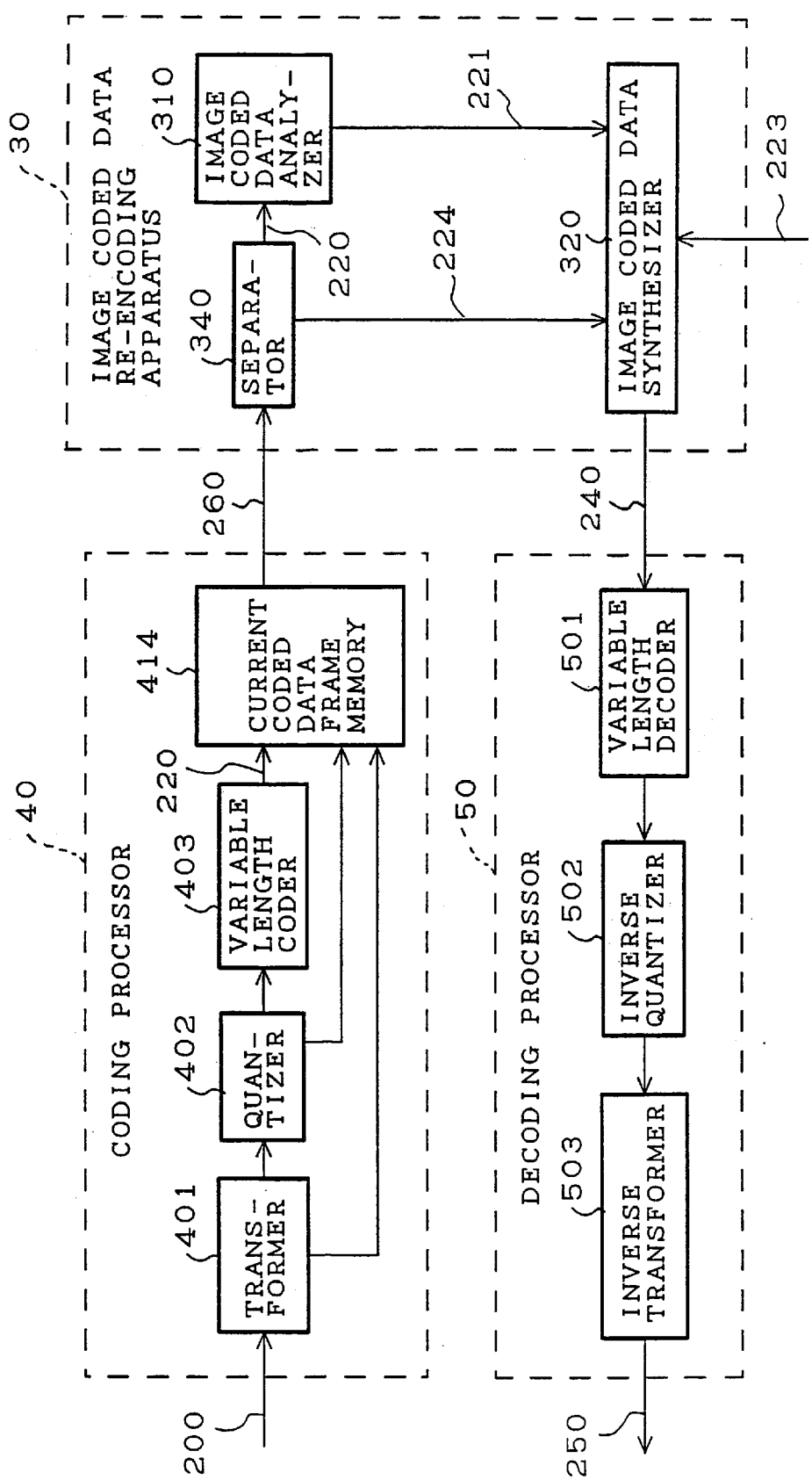
FIG. 5 is a block diagram showing a second embodiment of an image coded data re-encoding apparatus in accordance with the present invention.

FIG. 5 is a block diagram showing an embodiment 2 of the image coded data re-encoding apparatus 30 in accordance with the present invention together with the coding processor 40 and the decoding processor 50, wherein the corresponding portions are designated by the same reference numerals as in FIG. 1, and the description thereof is omitted here. In FIG. 5, the reference numeral 414 designates a combiner provided in the coding processor 40 for combining, with the first image coded data 220 which is output from the variable length coder 403, the above-mentioned information which is used by the transformer 401 and the quantizer 402 for generating the first image coded data 220 by coding the input image signal 200 in the coding processor 40, and which cannot be extracted in the process of applying the first digital signal processing to the first image coded data 220 in the image coded data re-encoding apparatus 30, and 260 designates combination data output from the combiner 414. The reference numeral 340 designates a separator provided in the image coded data re-encoding apparatus 30 for separating from the combination data 260 delivered from the coding processor 40 the first image coded data 220 and the information that cannot be extracted in the first digital data processing, and 224 designates multiple signals associated with the first image coded data corresponding to the information which cannot be extracted in the first digital signal processing. The first image coded data 220 and the multiple signals 224 associated with the first image coded data, which are separated by the separator 340, are supplied to the image coded data analyzer 310 and the image coded data synthesizer 320, respectively.

Next, the operation of the embodiment 2 will be described.

The coding processor 40 basically operates in the same manner as that of the embodiment 1: It performs the coding of the digital input image signal 200 to obtain the first image coded data 220. Only, it differs from the embodiment 1 in the following: The information which is used for the coding by the transformer 401 and the quantizer 402, and which cannot be extracted in the process of performing the first digital signal processing on the first image coded data 220 by the image coded data re-encoding apparatus 30, is sent to the combiner 414. The combiner 414 combines the information with the first image coded data 220 output from the variable length coder 403 to generate the combination data 260, and supplies it to the image coded data re-encoding apparatus 30. Here, the information which is output from the transformer 401 and the quantizer 402, and which cannot be extracted in the process of applying the first digital signal processing to the first image coded data 220, differs depending on the coding method employed. For example, when MPEG 1 is employed, the parameter used for specifying the type of the transformer 401 is output from the transformer 401, and the parameters used for specifying the characteristic of the quantizer 402 are output from the quantizer 402.

In the image coded data re-encoding apparatus 30, receiving the combination data 260 from the coding processor 40, the separator 340 separates it to the first image coded data 220 and the multiple signals 224 concerning the first image coded data associated with the information which cannot be extracted in the process of the first digital signal processing. The divided first image coded data 220 is supplied from the separator 340 to the image coded data analyzer 310. The image coded data analyzer 310 carries out the first digital signal processing of the first image coded data 220, and supplies the image coded data synthesizer 320 with the result of the first digital signal processing as the coded data after signal processing 221. Accordingly, in this case also, the image coded data analyzer 310 can be considered as a part of the image decoder. On the other hand, the multiple signals 224 concerning the first image coded data, which are separated by the separator 340, are input to the image coded data synthesizer 320. The image coded data synthesizer 320 paired with the image coded data analyzer 310, receiving the coded data after signal processing 221 and the multiple signals 224 concerning the first image coded data, carries out the second digital signal processing in accordance with the information 223 that commands the transform and defines the data amount and image size to be transformed. Accordingly, in this case also, the image coded data synthesizer 320 can be considered as a part of the image coder. The image synthesis processing of the coded data in the image coded data synthesizer 320 is performed in a manner similar to that of the embodiment 1 except that the multiple signals 224 concerning the first image coded data, which are separated from the combination data 260 by the separator 340, are used instead of the multiple signals 222 associated with the first image coded data, which are extracted by the image coded data analyzer 310. The multiple signals 224 concerning the first image coded data, which are used for transforming the first image coded data 220 into the second image coded data 240 without once decoding the first image coded data 220 into an image, also serves as the information for achieving improved images as compared with the case where the multiple signals 222 associated with the first image coded data is used. The second image coded data 240 generated as the result of the second digital signal processing is transmitted through a communication channel or recorded on the storage medium such as a CD-ROM or video tape, and is input to the decoding processor 50 which decodes it to the decoded image signal 250 in exactly the same way as the decoding processor 50 of the embodiment 1.

Thus, the embodiment 2 uses, for the second digital signal processing in the image coded data synthesizer 320, the multiple signals 224 which cannot be extracted in the process of the first digital signal processing. As a result, it has an advantage of achieving more efficient transform than an apparatus which does not use the multiple signals 224.

Embodiment 3

The foregoing embodiments generate the second image coded data 240 by applying the second digital signal processing to the coded data after signal processing 221 by using the multiple signals 222 or 224. It may also be possible to use, for carrying out the second digital signal processing of the first image coded data 220, multiple signals associated with the first image coded data 220, which are extracted or estimated from the coded data after signal processing 221 as information needed for re-encoding the coded data after signal processing 221. In this case, the coded data after signal processing 221 is obtained by decoding the first image coded data 220 through the first digital signal processing using the image coded data analyzer 310 as an image decoder and the image coded data synthesizer 320 as an image coder.

Figure 6:
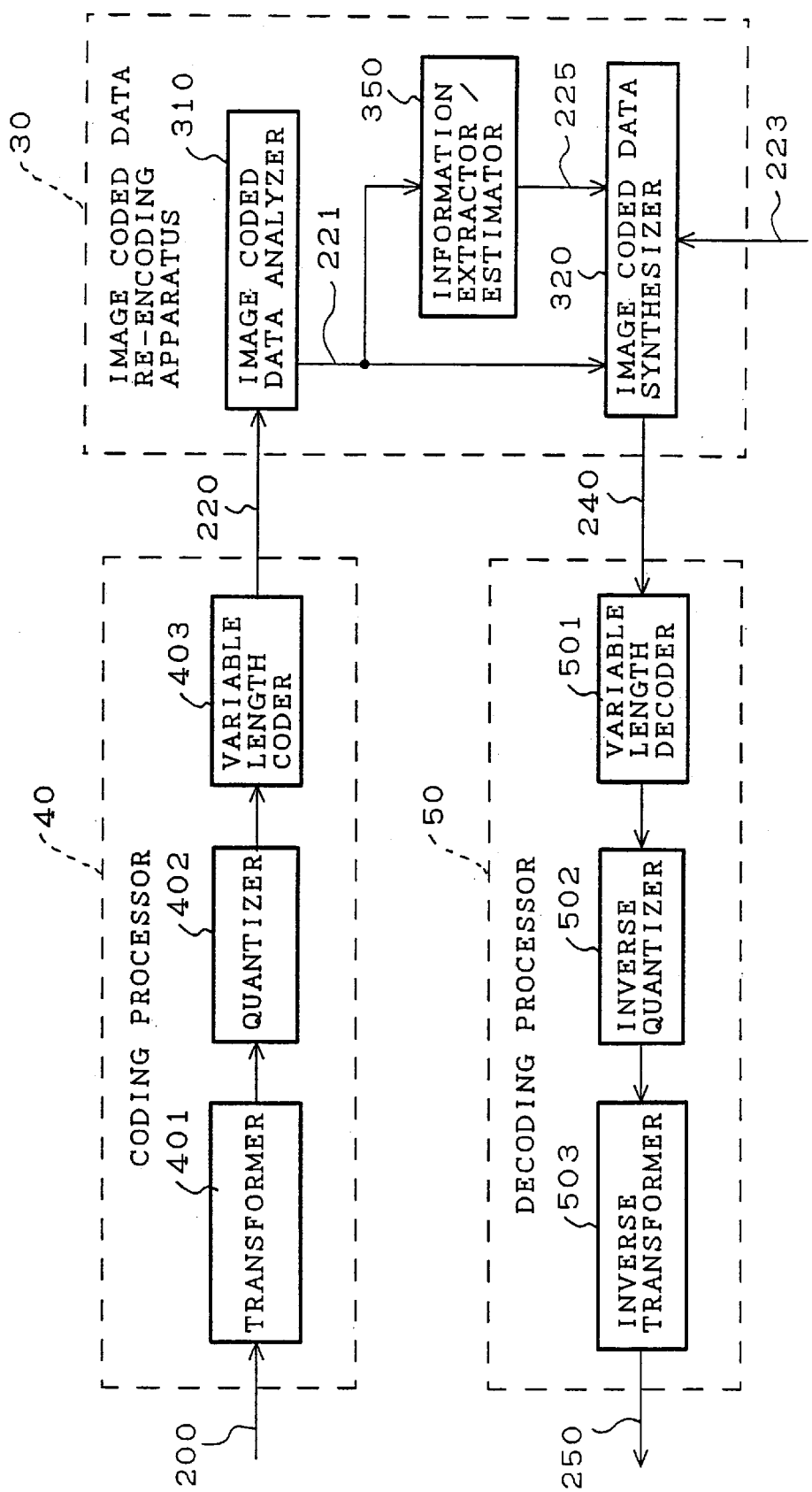
FIG. 6 is a block diagram showing a third embodiment of an image coded data re-encoding apparatus in accordance with the present invention.

FIG. 6 is a block diagram showing a third embodiment of the image coded data re-encoding apparatus 30 in accordance with the present invention, together with the coding processor 40 and decoding processor 50, in which the corresponding portions to those of the embodiment 1 are designated by the same reference numerals, and the description thereof is omitted here. In this figure, the reference numeral 350 designates an information extractor/estimator, and 225 designates multiple signals associated with the first image coded data output from the information extractor/estimator 350. The information extractor/estimator 350 extracts or estimates from the coded data after signal processing 221 the information which is needed for re-encoding the coded data after signal processing 221 in the second digital signal processing, and supplies the resultant information to the image coded data synthesizer 320 as the multiple signals 225 associated with the first image coded data. In this case, the coded data after signal processing 221 is obtained by decoding the first image coded data 220 by applying the first digital signal processing to the image coded data 220 in the image coded data analyzer 310.

Next, the operation will be described.

The description is omitted here of the process of generating the first image coded data 220 by coding the input image signal 200 with the coding processor 40, and the process of generating the decoded image signal 250 by decoding the second image coded data 240 with the decoding processor 50, because they are the same as those of the embodiment 1. Thus, the operation of only the image coded data re-encoding apparatus 30 will be described here.

In the image coded data re-encoding apparatus 30, receiving the first image coded data 220 from the coding processor 40, the image coded data analyzer 310 performs the first digital signal processing of the first image coded data 220 to decode it. The decoded image data is fed to the information extractor/estimator 350 and the image coded data synthesizer 320 as the coded data after signal processing 221. The information extractor/estimator 350 extracts or estimates from the coded data after signal processing 221 fed from the image coded data analyzer 310 the multiple signals 225 associated with the first image coded data, which are needed for the second digital signal processing in the image coded data synthesizer 320, and supplies them to the image coded data synthesizer 320. The image coded data synthesizer 320 is provided with the information 223 which defines the data amount and image size to be transformed and commands the transform, in addition to the multiple signals 225 associated with the first image coded data, and the coded data after signal processing 221 from the image coded data analyzer 310. The image coded data synthesizer 320 applies the second digital signal processing to the coded data after signal processing 221 to generate the second image coded data 240. In this case, the multiple signals 225 associated with the first image coded data which are extracted or estimated from the coded data after signal processing 221 by the information extractor/estimator 350 are not only used for decoding the first image coded data 220 into an image, but also are used for generating the second image coded data 240. The thus generated second image coded data 240 is fed from the image coded data re-encoding apparatus 30 to the decoding processor 50.

The embodiment 3 with such an arrangement has an advantage that the configuration of the image coded data re-encoding apparatus 30 is simplified. This is because no special processing is required for decoding since the multiple signals 225 associated with the first image coded data 220, which are needed for the second digital signal processing by the image coded data synthesizer 320, are extracted or estimated from the coded data after signal processing 221 which are once decoded from the first image coded data 220.

Embodiment 4

Figure 7:
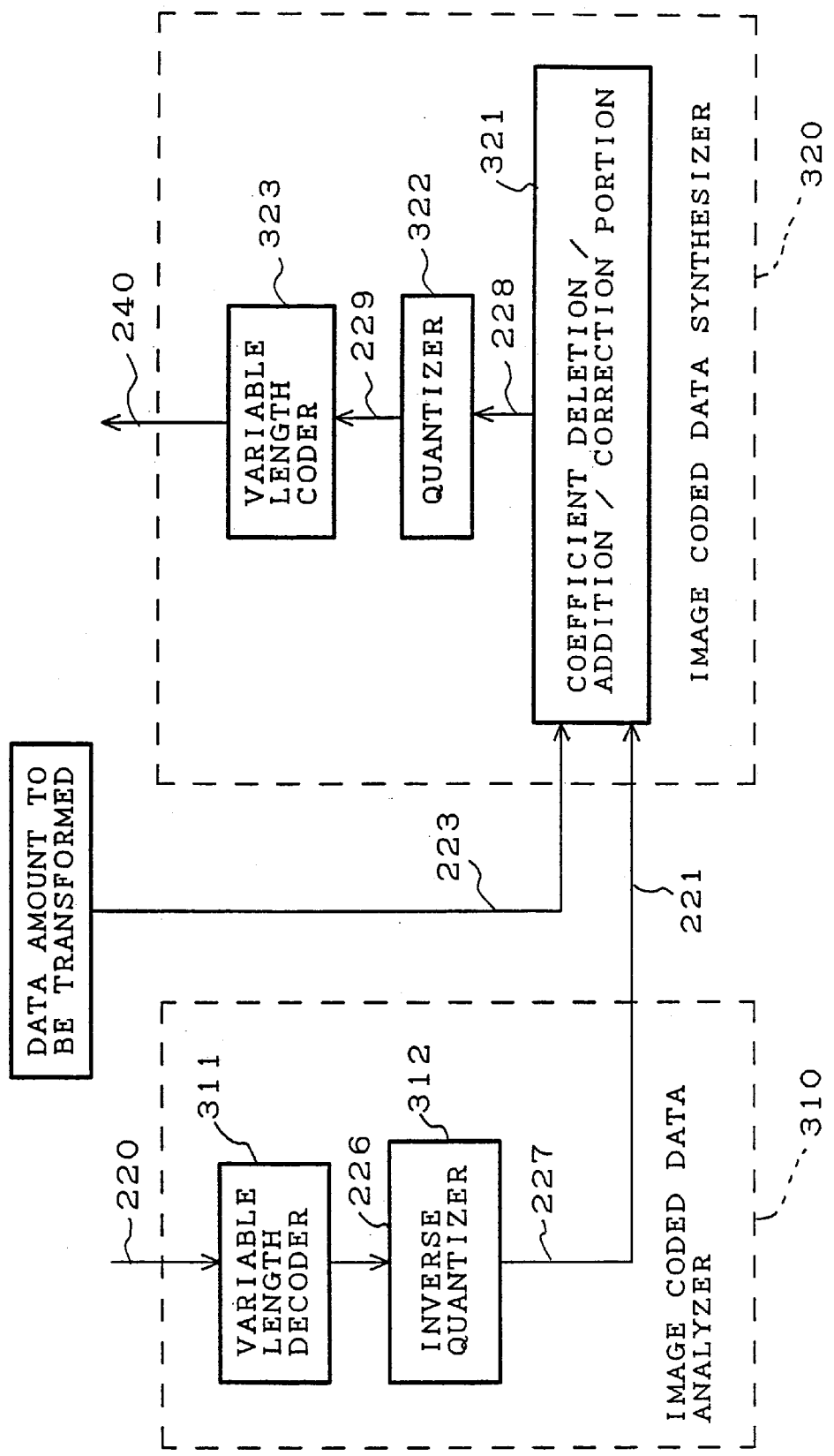
FIG. 7 is a block diagram showing fourth to seventh embodiments of an image coded data re-encoding apparatus in accordance with the present invention.

FIG. 7 is a block diagram showing the internal configuration of the image coded data analyzer 310 and the image coded data synthesizer 320 as an embodiment 4 of the image coded data re-encoding apparatus 30 in accordance with the present invention, which can reduce the amount of data between the first image coded data 220 and the second image coded data 240. In this figure, the reference numeral 311 designates a variable length decoder for carrying out variable length decoding of the first image coded data 220 delivered from the coding processor 40, and 226 designates quantization indices, the result of the decoding produced from the variable length decoder 311. The reference numeral 312 designates an inverse quantizer for performing inverse quantization of the quantization indices 226, and 227 designates transform coefficients, the result of the inverse quantization by the inverse quantizer 312. The inversely quantized transform coefficients 227 is output as the coded data after signal processing 221. The image coded data analyzer 310 in accordance with the present embodiment 4 includes these variable length decoder 311 and inverse quantizer 312.

The reference numeral 321 designates a coefficient deletion/addition/correction portion for deleting, adding or correcting a part of the inversely quantized transform coefficients 227 delivered from the image coded data analyzer 310 as the coded data after signal processing 221 in response to the information 223 that commands the transform and defines the data amount to be transformed. The reference numeral 228 designated corrected transform coefficients, the result of the coefficient correction by the coefficient deletion/addition/correction portion 321, and 229 designates quantization indices, the result of the quantization, produced from a quantizer 322. The reference numeral 323 designates a variable length coder which codes the quantization indices 229, and supplies the decoding processor 50 with the resultant second image coded data 240. The image coded data synthesizer 320 in accordance with the embodiment 4 includes the coefficient deletion/addition/correction portion 321, quantizer 322 and variable length coder 323.

Next, the operation will be described.

It is assumed here, that the coding processor 40 and the decoding processor 50 employ a coding system based on the transform coding including the coding and quantization as a basic function, and that the image coded data analyzer 310 performs a part of the decoding, wherein the coding processor 40 generates the first image coded data 220 by coding the input image signal 200, and supplies it to the image coded data re-encoding apparatus 30, and the decoding processor 50 generates the decoded image signal 250 by decoding the second image coded data 240 which the image coded data re-encoding apparatus 30 outputs. In this case, the image coded data analyzer 310 extracts the transform coefficients or the quantization indices by carrying out the inverse quantization of the first image coded data 220, and the image coded data synthesizer 320 deletes a part of the inverse quantized transform coefficients or the quantization indices, and corrects the remaining transform coefficients and the quantization indices in accordance with the ratio of the amount of the data to be transformed. This can facilitate the transform considering the image quality after the inverse transform as compared with the case where part of the transform coefficients or the quantization indices is simply deleted.

Referring the drawings, the operation will be described in more detail.

The variable length decoder 311, receiving the first image coded data 220, carries out the variable length decoding referring a table prepared in advance to produce the combination data 260 corresponding to the first image coded data 220. An example of the table is shown in Table 1.

TABLE 1

| occurrence probability | data | code (coded data) |
|---|---|---|
| 0.3 | 1 | 00 |
| 0.25 | 2 | 01 |
| 0.2 | 3 | 11 |
| 0.1 | 4 | 101 |
| 0.08 | 5 | 1000 |
| 0.07 | 6 | 1001 |

In this table, each of six data is assigned a code corresponding to the possibility of occurrence such that a shorter code is assigned to data with higher possibility of occurrence, and vice versa. Thus, assignment of codes with different length is performed in accordance with the possibility of occurrence of the quantization indices. The variable length decoder 311 carries out the variable length decoding by extracting data corresponding to the code (coded data) from the table.

Thus, the quantization indices 226 output from the variable length decoder 311 are input to the inverse quantizer 312. The inverse quantizer 312 generates the inversely quantized transform coefficients 227 by performing the inverse quantization of the quantization indices 226 in accordance with the quantization parameters (not shown), and supplies it to the image coded data synthesizer 320 as the coded data after signal processing 221. Incidentally, the quantization in the digital processing can usually be achieved by division, whereas the inverse quantization is achieved by multiplication.

The coefficient deletion/addition/correction portion 321 of the image coded data synthesizer 320, receiving the information 223 which commands the transform, deletes a part of the coded data after signal processing 221 fed from the image coded data analyzer 310 in accordance with the data amount to be transformed instructed by the information 223 commanding transform, and carries out the coefficient correction of the remainder of the coded data in accordance with the ratio of the data amount to be transformed which is defined by the information 223 commanding transform.

In this embodiment 4 of the image coded data re-encoding apparatus 30, the data amount is reduced through the transform. When reducing the data amount of the transform coefficients, it is advantageous to start deletion of the transform coefficients from higher frequency components because lower frequency components are more significant than the higher frequency components of the transform coefficients. In this case, although simple deletion of the data in a particular region of the transform coefficients is effective for reducing the data amount itself, this will effect on the quality of images decoded from the transform coefficients with the reduced data amount. To prevent this, the present embodiment 4 not only deletes part of the transform coefficients 227, but also corrects the remainder of the transform coefficients 227 in accordance with the ratio of the data amount to be transformed which is instructed by the information 223 commanding transform. In this process, the effect on the decoded image the deleted part will produce is predicted, so that the correction of the remainder of the transform coefficients 227 is achieved such that the effect becomes minimum.

The coefficient deletion/addition/correction portion 321 deletes the part of the transform coefficients 227 in this way, and the corrected transform coefficients 228 generated by correcting the remainder are input to the quantizer 322. The quantizer 322 carries out the quantization of the corrected transform coefficients 228 to generate the quantization indices 229, and supplies them to the variable length coder 323. The variable length coder 323 performs the variable length coding of the quantization indices 229 in accordance with the quantization parameters output from the quantizer 322 to generate the second image coded data 240, and delivers it to the decoding processor 50.

According to the embodiment 4, the deletion of the part of the transform coefficients 227, which are transferred from the image coded data analyzer 310 as the coded data after signal processing 221, enables the data amount to be reduced. In addition, the correction of the remainder of the transform coefficients 227 in accordance with the ratio of its data amount enables the decoded image quality to be improved as compared with that obtained by simply thinning out the transform coefficients.

Embodiment 5

In the embodiment 4, the data amount is reduced between the first image coded data 220 and the second image coded data 240 by deleting a part of the reversely quantized transform coefficients or the quantization indices, and by correcting the transform coefficients in accordance with the amount of data to be transformed. A part of the transform coefficients or the quantization indices, however, may be deleted by weighting the transform coefficients or the quantization indices to be reduced with the neighboring transform coefficients or the quantization indices, which is implemented in the embodiment 5.

In the embodiment 5 of the image coded data re-encoding apparatus, the image coded data analyzer 310 as shown in FIG. 7 carries out the processings as follows: First, the variable length decoder 311 decodes the first image coded data 220 into the quantization indices 226. Then, the inverse quantizer 312 performs the inverse quantization of the decoded quantization indices 226, and transfers the resultant transform coefficients 227 to the image coded data synthesizer 320 as the coded data after signal processing 221. The image coded data synthesizer 320 receives the transform coefficients 227 with the coefficient deletion/addition/ correction portion 321 which deletes part of the transform coefficients 227 after weighting the transform coefficients 227 with its neighboring transform coefficients. Specifically, the coefficient deletion/addition/correction portion 321 examines, before deleting part of the transform coefficients 227, the relationship between the transform coefficients to be deleted and their neighboring transform coefficients, performs weighting such that the deletion has a minimum effect on the quality of the decoded image, and deletes the transform coefficients to be deleted.

The embodiment 5 also, as the embodiment 4, enables the decoded image quality to be improved as compared with that obtained by simply thinning out the transform coefficients.

Embodiment 6

Although the data amount is reduced between the first image coded data 220 and the second image coded data 240 in the embodiments 4 and 5, it can be increases by adding new transform coefficients or quantization indices. In this case, the transform coefficients, which are added to the inversely quantized transform coefficients or quantization indices, are corrected in accordance to the ratio of the amount of data to be transformed, which is implemented in the embodiment 6.

In the embodiment 6 of the image coded data re-encoding apparatus, the image coded data analyzer 310 as shown in FIG. 7 carries out the processings as follows: First, the variable length decoder 311 decodes the first image coded data 220 into the quantization indices 226. Then, the inverse quantizer 312 performs the inverse quantization of the decoded quantization indices 226, and transfers the resultant transform coefficients 227 to the image coded data synthesizer 320. The image coded data synthesizer 320 receives the transform coefficients 227 with the coefficient deletion/addition/correction portion 321 which carries out the addition of new transform coefficients to increase the amount of data of the second image coded data 240 by using the transform coefficients 227 and a picture type which is obtained in the decoding procedure of the image coded data. Specifically, the coefficient deletion/addition/correction portion 321 carries out the correction of the newly added transform coefficients such that the effect of addition on the quality of the decoded image becomes minimum, in accordance with the ratio of the data amount defined by the information that commands the transform.

Considering the effect on the quality of the decoded image of increasing the data amount between the first image coded data 220 and the second image coded data 240, it will be advantageous to add the high frequency components of the transform coefficients or the quantization indices as in the case of reducing the data amount. Furthermore, the addition of the transform coefficients or the quantization indices in the higher frequency domain induces a greater change in the data amount than that in the lower frequency domain.

Thus, the embodiment 6 corrects the newly added transform coefficients or the quantization indices in accordance with the ratio of the amount of data to be transformed. This makes it possible to add the data considering the image quality after the inverse transform, thereby achieving a higher image quality than that obtained by simply thinning out the transform coefficients.

Embodiment 7

The embodiment 6 corrects the newly added transform coefficients or the quantization indices in accordance with the ratio of the amount of data to be transformed, when adding the transform coefficients or the quantization indices to the inversely quantized transform coefficients or the quantization indices to increase the amount of data between the first image coded data 220 and the second image coded data 240. The addition of the transform coefficients or quantization indices may be performed after predicting the transform coefficients or quantization indices including the newly added transform coefficients or quantization indices and their neighboring transform coefficients or quantization indices, which is implemented in the embodiment 7.

In the embodiment 7 of the image coded data re-encoding apparatus, the image coded data analyzer 310 as shown in FIG. 7 carries out the processings as follows: First, the variable length decoder 311 decodes the first image coded data 220 into the quantization indices 226. Then, the inverse quantizer 312 performs the inverse quantization of the obtained quantization indices 226, and transfers the resultant transform coefficients 227 to the image coded data synthesizer 320. The image coded data synthesizer 320 receives the transform coefficients 227 with the coefficient deletion/addition/correction portion 321 which carries out prediction of the transform coefficients including the newly added transform coefficients and their neighboring transform coefficients, followed by the addition of the transform coefficients, when increasing the data amount of the second image coded data 240 after the transform by using the received transform coefficients 227.

Thus, the embodiment 7 adds the transform coefficients or quantization indices after predicting the transform coefficients or quantization indices to be added and their neighbors. This makes it possible to implement more vivid images, providing an advantage of achieving the transform resulting in higher image quality than that obtained by the transform which simply thins out the transform coefficients.

Embodiment 8

Figure 8:
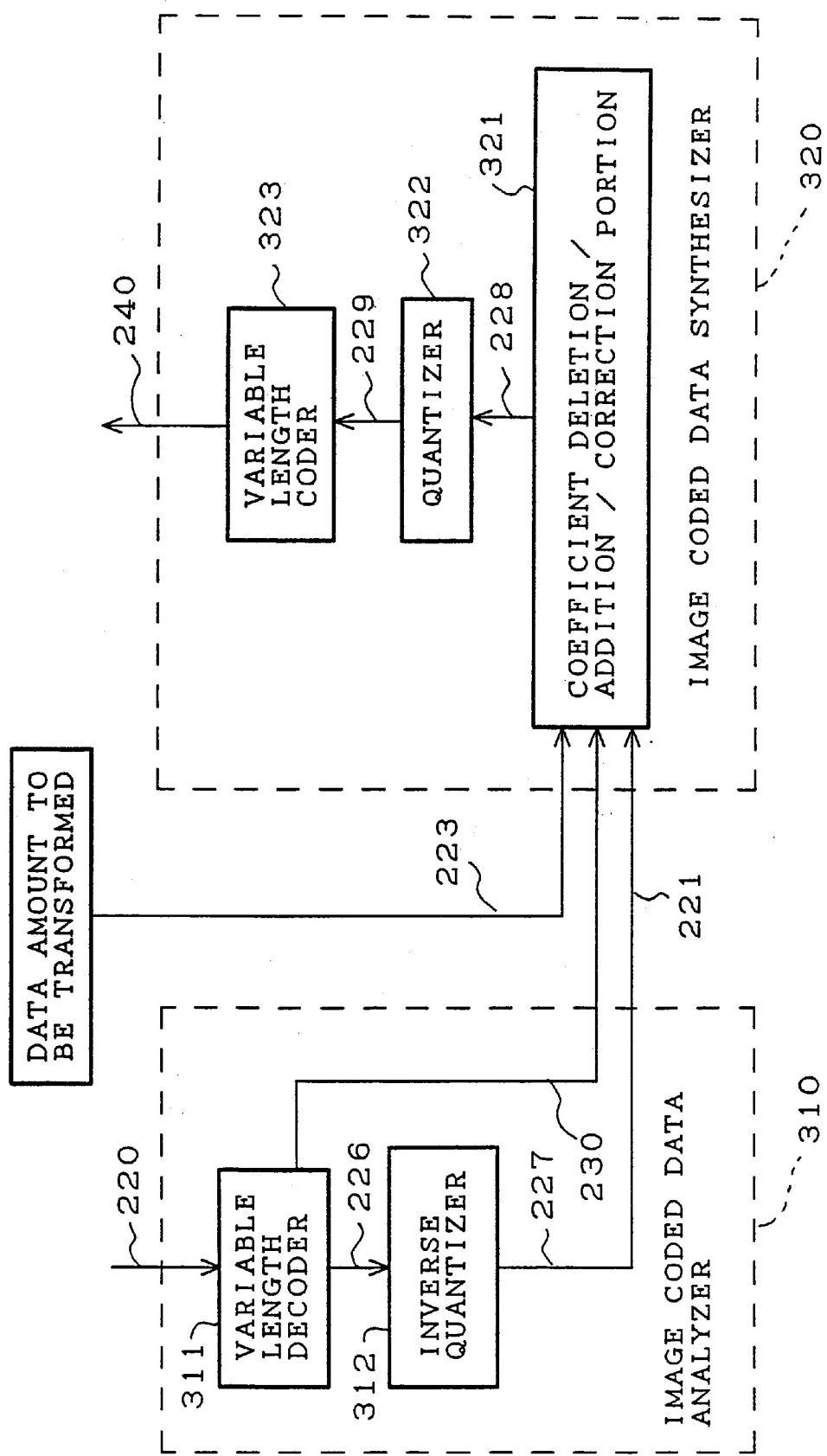
FIG. 8 is a block diagram showing eighth and ninth embodiments of an image coded data re-encoding apparatus in accordance with the present invention.

FIG. 8 is a block diagram showing the internal configuration of the image coded data analyzer 310 and the image coded data synthesizer 320 of an eighth embodiment of the image coded data re-encoding apparatus 30 in accordance with the present invention, which reduces the data amount between the first image coded data 220 and the second image coded data 240. In this figure, the reference numeral 230 designates coded picture information as a coding parameter indicating the picture type. The coded picture information 230 is output as the result of the decoding from the variable length decoder 311 which performs the variable length decoding of the first image coded data 220 supplied from the coding processor 40. The remaining portions are the same as those of FIG. 7, and the description thereof is omitted here. The variable length decoder 311, however, differs from that of the embodiment 4 in that it outputs the coded picture information 230 besides the quantization indices 226. In addition, the coefficient deletion/addition/correction portion 321 differs from that of the embodiment 4 in that it deletes, adds or corrects part of the transform coefficients 227 by using the coded picture information 230 besides the amount of data to be transformed which is instructed by the information 223 commanding the transform. The coded picture information 230 here is a parameter multiplexed picture by picture to represent the attributes such as the size of the picture, coding type of the picture (that is, the intra-frame coding, unidirectional motion compensative inter-frame predictive coding, or bidirectional motion compensative inter-frame predictive coding), maximum value of vectors used by the picture, and adaptive parameters used by the picture.

The operation will now be described.

The eighth embodiment of the image coded data re-encoding apparatus implements the transform that can reduce the total degradation of the image quality by increasing the ratio of deletion of the transform coefficients or quantization indices included in the picture types which will not be used in the future prediction. This is performed by using the transform coefficients or quantization indices obtained by the inverse quantization of the first image coded data 220 in the image coded data analyzer 310, and the coded picture parameter obtained in the course of decoding the first image coded data 220.

In the image coded data analyzer 310 as shown in FIG. 8, the variable length decoder 311 provides the inverse quantizer 312 with the quantization indices 226 obtained as a result of decoding the first image coded data 220, and supplies the image coded data synthesizer 320 with the coded picture information 230 obtained in the course of the decoding. The inverse quantizer 312 carries out the inverse quantization of the received quantization indices 226, and sends the resultant transform coefficients 227 to the image coded data synthesizer 320 as the coded data after signal processing 221. In the image coded data synthesizer 320, on the other hand, the coefficient deletion/addition/correction portion 321 receives the information 223, which commands the transform and defines the amount of data to be transformed, and deletes part of the received transform coefficients 227. When the information 223 indicates the coded picture which will not be used for the prediction in the future coding, the ratio of deletion of the transform coefficients is increased. The received coded picture information 230 includes, as described above, the coding type of the picture. When the coding type indicates the bidirectional motion compensative inter-frame prediction coding according to the MPEG 1, for example, the picture information is not used for the future coding. Thus, even if the reduction of the data amount results in the degradation of the image quality, there is no fear that it will continue. As a result, an increase in the deletion ratio of the transform coefficients in such picture information will improve the efficiency of the reduction df the data amount.

Thus, according to the embodiment 8, an advantage is obtained that the data reduction can be implemented with high total efficiency by further reducing the data amount when the coded frame is not used in the next coding interval.

Embodiment 9

Although the embodiment 8 handles the case in which the reduction ratio of the transform coefficients is increased when the information 223 indicates that the coded picture will not be used in the future prediction, the reduction ratio of the transform coefficients may be reduced when the information indicates that the coded picture will be used in the following prediction. More specifically, when the picture type indicates the use in the future coding, the reduction ratio of the transform coefficients or quantization indices will be reduced by using the transform coefficients or quantization indices obtained by the inverse quantization of the first image coded data 220 in the image coded data analyzer 310 as shown in FIG. 8, and by using the picture type obtained in the course of decoding the first image coded data 220. Thus, the transform is implemented which can prevent the degradation from being continued to the future by the prediction.

As a result, the embodiment 9 has an advantage of achieving data reduction with higher total efficiency by decreasing the reduction in the amount of data of the coded data, when the coded frame is used in the next coding interval.

Embodiment 10

Figure 9:
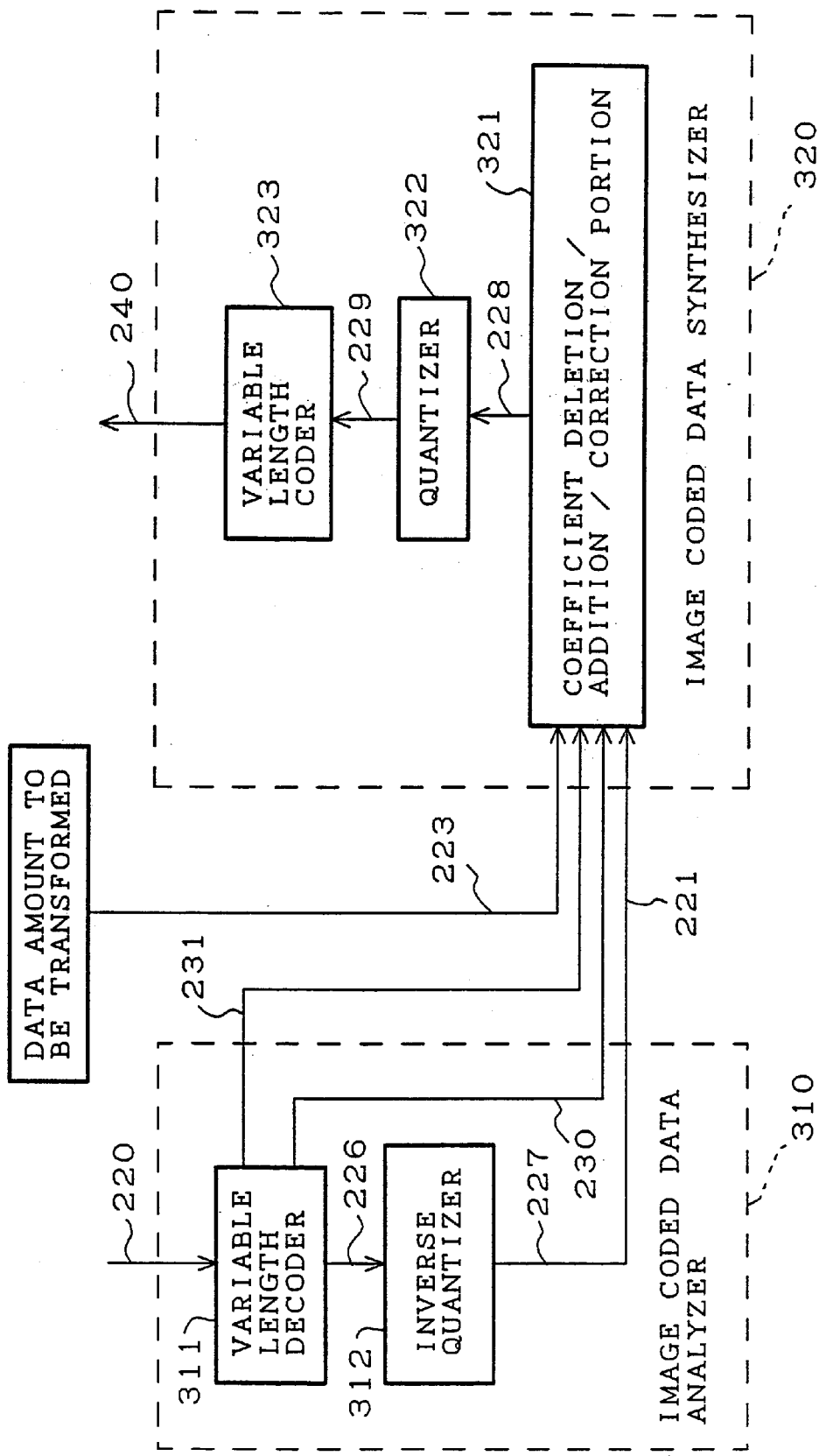
FIG. 9 is a block diagram showing a tenth embodiment of an image coded data re-encoding apparatus in accordance with the present invention.

FIG. 9 is a block diagram showing the internal configuration of the image coded data analyzer 310 and image coded data synthesizer 320 of an embodiment 10 of the image coded data re-encoding apparatus 30 in accordance with the present invention, which reduces the amount of data between the first image coded data 220 and the second image coded data 240. In this figure, the reference numeral 231 designates coded block information, one of the coding parameters indicating the predictive type of the image block. The coded block information 231 is output as the result of decoding by the variable length decoder 311 which carries out the variable length decoding of the first image coded data 220 supplied from the coding processor 40. The remaining portions are designated by the same reference numerals as in FIG. 8, and the description thereof is omitted here. The variable length decoder 311, however, differs from that of the embodiment 8 in that it outputs the coded block information 231 besides the quantization indices 226 and the coded picture information 230. In addition, the coefficient deletion/addition/correction portion 321 differs from that of the embodiment 8 in that it deletes, adds or corrects part of the transform coefficients 227 by using the coded block information 231 besides the coded picture information 230 and the amount of data to be transformed, which is instructed by the information 223 commanding the transform. The coded block information 231 is the information about the coded block (often called micro-block in the MPEG 1) which is the minimum unit of coding and represents quantization parameters, motion vectors, and the presence or absence of the motion compensative prediction, which are used in the coded block.

Next, the operation will be described.

The tenth embodiment of the image coded data re-encoding apparatus implements the transform that can reduce the total degradation of the image quality by increasing the ratio of deletion of the transform coefficients or quantization indices included in the image blocks which are not used in the prediction, even if they belong to the picture types which will be used in the future coding. This is performed by using the transform coefficients or quantization indices obtained by the inverse quantization of the first image coded data 220 in the image coded data analyzer 310, and the picture types obtained in the course of decoding the first image coded data 220.

In the image coded data analyzer 310 as shown in FIG. 9, the variable length decoder 311 provides the inverse quantizer 312 with the quantization indices 226 obtained as a result of decoding the first image coded data 220, and supplies the image coded data synthesizer 320 with the coded picture information 230 and coded block information 231 which are obtained in the course of the decoding. The inverse quantizer 312 carries out the inverse quantization of the received quantization indices 226, and sends the resultant transform coefficients 227 to the image coded data synthesizer 320 as the coded data after signal processing 221. In the image coded data synthesizer 320, on the other hand, the coefficient deletion/addition/correction portion 321 receives the transform coefficients 227, coded picture information 230 and coded block information 231 besides the information 223, which commands the transform and defines the amount of data to be transformed, and deletes part of the received transform coefficients 227. In the course of this, the coefficient deletion/addition/correction portion 321 decides on the basis of the received coded block information 231 whether the information of the image block is used in the future coding, not on the coded picture basis but on the image block basis which enables finer control. If the result of this indicates that the image block is not used in prediction in the future coding, even though the coded picture will be used in the prediction in the future coding, the deletion ratio of the transform coefficients is increased.

Thus, according to the embodiment 10, an advantage is obtained that the control based on a finer unit becomes possible and higher quality transform is achieved, because the decision is made whether the deletion ratio of the transform coefficients or quantization indices should be increased or not by using the coded block information 231 in addition to the coded picture information 230.

Embodiment 11

Figure 10:
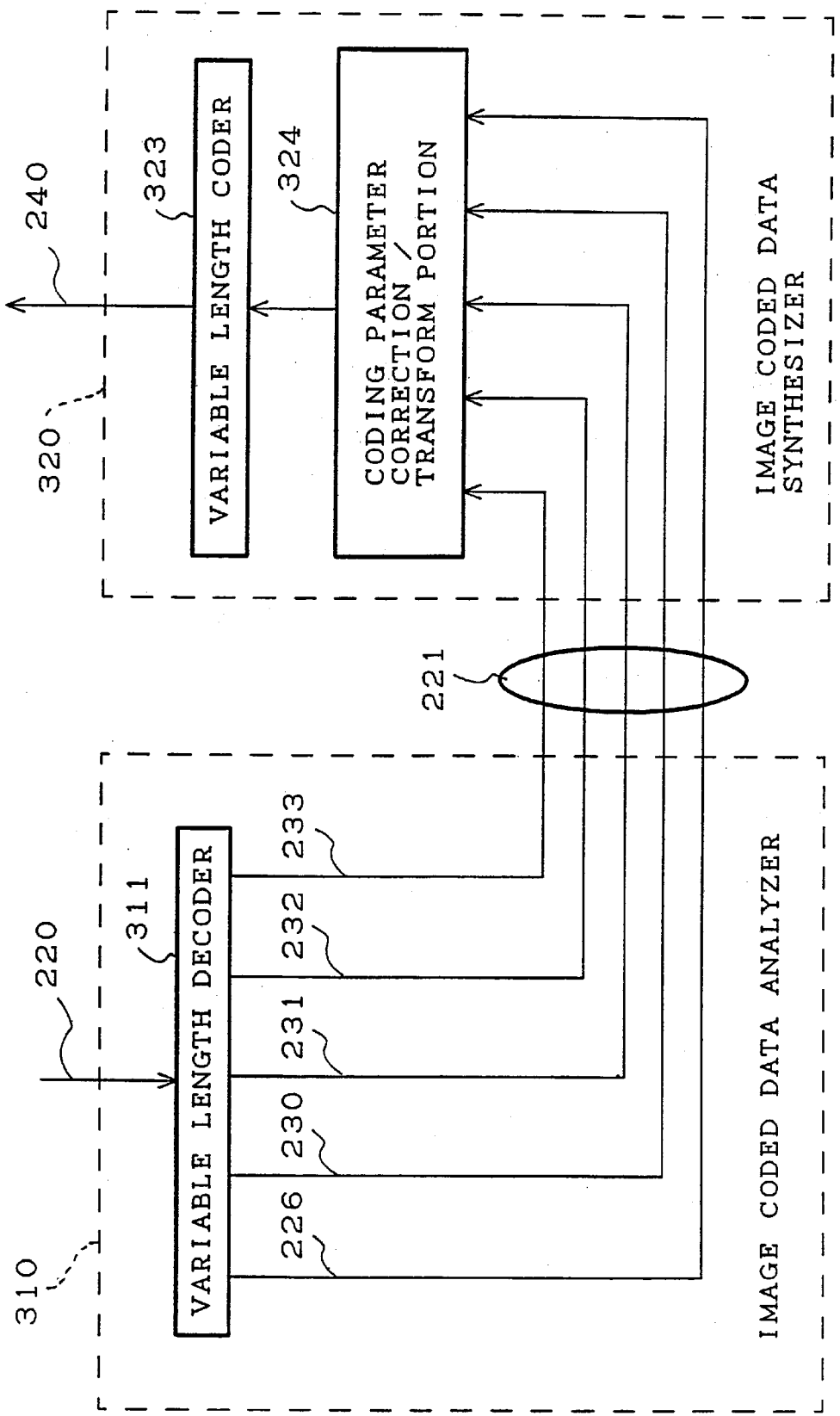
FIG. 10 is a block diagram showing an eleventh embodiment of an image coded data re-encoding apparatus in accordance with the present invention.

FIG. 10 is a block diagram showing the internal configuration of the image coded data analyzer 310 and image coded data synthesizer 320 of an embodiment 11 of the image coded data re-encoding apparatus 30 in accordance with the present invention, in which the decoding procedure of the first image coded data 220 differs from that of the second image coded data 240. In this figure, the reference numeral 311 designates a variable length decoder which carries out the variable length decoding of the first image coded data 220 supplied from the coding processor 40. The reference numeral 226 designates quantization indices, 230 designates coded picture information, 231 designates coded block information, 232 designates quantization parameter information, and 233 designates motion vector information, all of which are output from the variable length decoder 311 as coding parameters as the result of the decoding, and are supplied to the image coded data synthesizer 320 as the coded data after signal processing 221. The variable length decoder 311 with such an arrangement is included in the image coded data analyzer 310 in this embodiment 11. The quantization parameter information 232 and motion vector information 233 are handled as one of the coded block information 231.

The reference numeral 324 designates a coding parameter correction/transform portion which transforms the coding parameters such as the quantization indices 226, coded picture information 230, coded block information 231, quantization parameter information 232 and motion vector information 233 fed from the image coded data analyzer 310 as the coded data after signal processing 221 so that they match the coding system after the transform. The reference numeral 323 designates a variable length coder that carries out coding of the transformed output from the coding parameter correction/transform portion 324, and supplies the resultant second image coded data 240 to the decoding processor 50. The coding parameter correction/transform portion 324 and variable length coder 323 are included in the image coded data synthesizer 320 of the embodiment 11.

Next, the operation will be described.

The following processing is carried out to make difference between the decoding procedure of the first image coded data 220 input to the image coded data analyzer 310 and that of the second image coded data 240 output from the image coded data synthesizer 320. For example, let us consider the case where the input first image coded data 220 is based on the MPEG 1, and the output second image coded data 240 is based on H. 261 defining the coding system for visual telephone and video conference. In the image coded data analyzer 310, the variable length decoder 311 extracts from the input first image coded data 220 based on the MPEG 1 the coding parameters such as quantization indices 226, coded picture information 230, coded block information 231, quantization parameter information 232 and motion vector information 233, and supplies them to the image coded data synthesizer 320 as the coded data after signal processing 221. In the image coded data synthesizer 320, the coding parameter correction/transform portion 324 receives the coded data after signal processing 221, and transforms the coding parameters in the MPEG 1 representation into those in the H. 261 representation.

More concrete description will be provided of the transform from the MPEG 1 image coded data to the H. 261 image coded data, taking the motion vector information 233 as an example. Although ½ pixel motion vectors are available in the MPEG 1, only integer multiple accuracy motion vectors are available in the H. 261. Accordingly, the coding parameter correction/transform portion 324 carries out the transform in which it extracts only the integer portion of each of the MPEG 1 motion vectors which is considered optimum, and uses it as the H. 261 motion vectors. Likewise, the coding parameters such as the quantization parameter information 232 and quantization indices 226 are transformed into parameter values which are considered optimum in the H. 261 unless they are used in exactly the same sense in both the MPEG 1 and H. 261. The coding parameters transformed by the coding parameter correction/transform portion 324 such that they match the H. 261 coding system are synthesized to the second image coded data 240 by the variable length coder 323 and output therefrom.

Thus, according to the embodiment 11, it is not necessary to decode the first image coded data 220 to an image once, and then re-encode the image by an image coder based on the required coding system, thereby offering an advantage of implementing a small, low cost apparatus. This holds true even when the first image coded data 220 input to the image coded data analyzer 310 is transformed and output from the image coded data synthesizer 320 as the second image coded data 240 which is processed in the decoding procedure different from that of the first image coded data 220.

Embodiment 12

Figure 11:
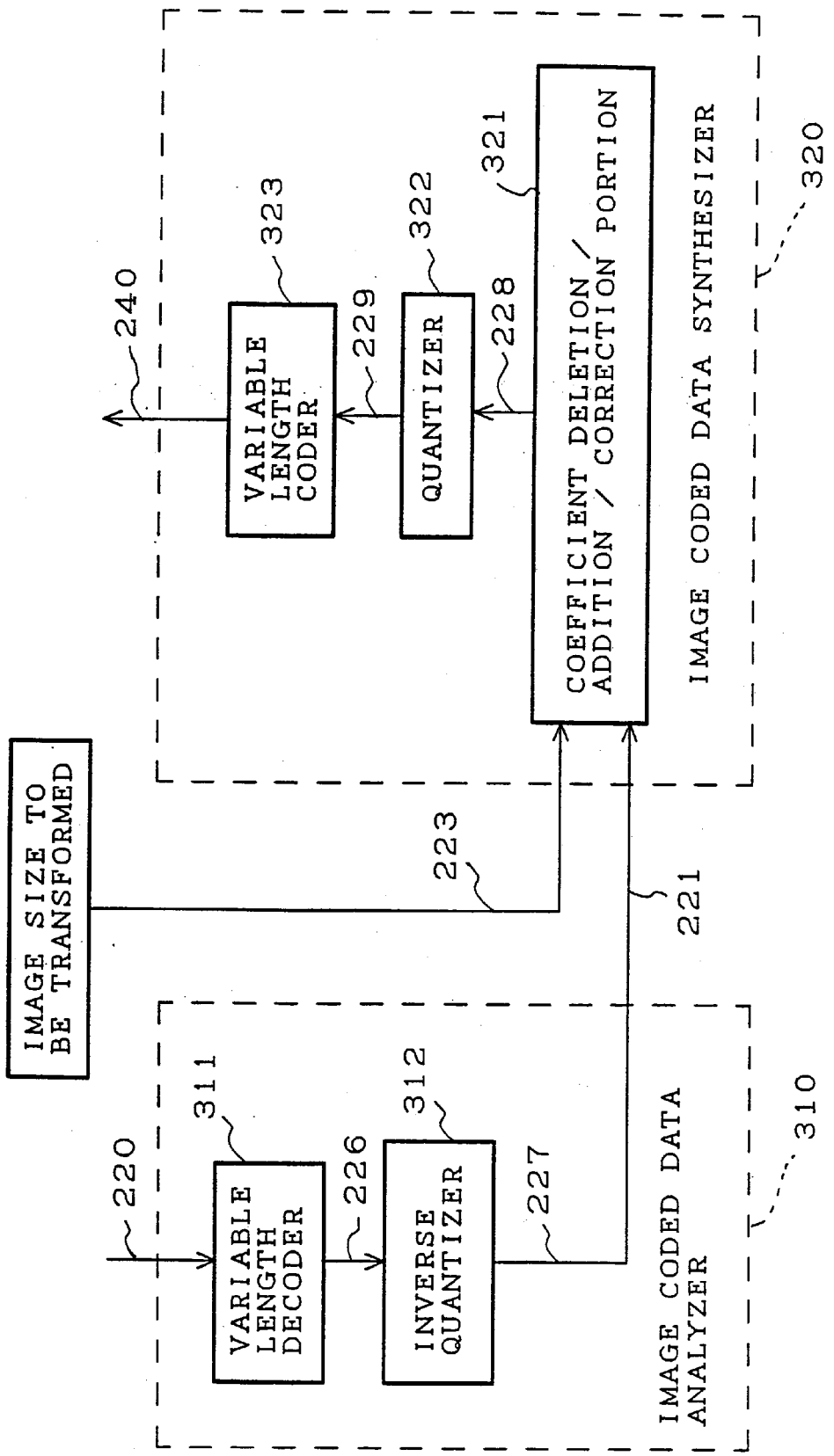
FIG. 11 is a block diagram showing a twelfth embodiment of an image coded data re-encoding apparatus in accordance with the present invention.

FIG. 11 is a block diagram showing the internal configuration of the image coded data analyzer 310 and image coded data synthesizer 320 of an embodiment 12 of the image coded data re-encoding apparatus 30 in accordance with the present invention, which transforms image size between the first image coded data 220 and the second image coded data 240. In this figure, the same or like portions are designated by the same reference numerals as in FIG. 7, and the description thereof is omitted here. The present embodiment 12 differs from the embodiment 4 in that the image size is defined by the information 223 which commands the transform, and that the coefficient deletion/addition/correction portion 321 deletes or corrects the transform coefficients 227 which are obtained through the inverse quantization by the inverse quantizer 312, by using the image size instructed by the information 223 commanding the transform.

Next, the operation will be described.

Let us assume that the transform is carried out between the first image coded data 220 which is input to the image coded data analyzer 310 and the second image coded data 240 which is output from the image coded data synthesizer 320, each including an image signal of a different image size, and that the coding processor 40 which generates the first image coded data 220 and the decoding processor 50 which decodes the second image coded data 240 carry out processing based on transform coding including the motion compensative prediction, transform and quantization as shown in FIGS. 2 and 4, respectively. When the inversely quantized transform coefficients or quantization indices, which are extracted in the image coded data analyzer 310, are increased or decreased, they are corrected in accordance with the ratio of the image sizes to be transformed. This makes it possible to reduce the substantial degradation in the resolution or unnatural images which readily occur during the transform.

Referring to FIG. 11, the present embodiment will be described in more detail.

In the image coded data analyzer 310 as shown in FIG. 11, the variable length decoder 311 decodes the first image coded data 220 to the quantization indices 226. The inverse quantizer 312 carries out inverse quantization, and supplies the resultant transform coefficients 227 to the image coded data synthesizer 320 as the coded data after signal processing 221. In the image coded data synthesizer 320, the coefficient deletion/addition/correction portion 321 receives the transform coefficients 227 together with the information 223 commanding the transform. The coefficient deletion/addition/correction portion 321 performs revision like deletion/addition/correction of the transform coefficients to be increased or decreased in accordance with the image sizes to be transformed which are defined by the information 223 commanding the transform. When reducing the image size, for example, the number of samplings of the image after transform is reduced as compared with that of the original image, and hence the frequency components of the image after transform will be lowered. Accordingly, some form of band limit is required, which is performed on the transform coefficients 227. Thus, the revision is carried out in transforming the coded data of the original image to that of a smaller size image by suppressing high frequency components. The revised corrected transform coefficients 228 is fed from the coefficient deletion/addition/correction portion 321 to the quantizer 322 which generates the quantization indices 229 by the quantization. Then, the variable length coder 323 applies the variable length coding to the quantization indices 229, and supplies the resultant second image coded data 240 to the decoding processor 50.

Thus, according to the embodiment 12, since the transform coefficients to be increased or decreased are corrected in accordance with the image sizes to be transformed when performing the transform of the coded data involving the image size transform, an advantage is gained that it becomes possible to prevent the substantial degradation in the resolution or the occurrence of unnatural images, and the degradation in the image quality after the image size transform.

Embodiment 13

Although the transform coefficients to be increased or decreased are revised in accordance with the ratio of the image sizes which are transformed between the first image coded data 220 and the second image coded data 240 in the embodiment 12, the dimension of the motion vectors used for the motion compensation may be revised in accordance with the ratio of the image sizes to be transformed, to transform the first image coded data 220 to the second image coded data 240 of a different image size. This is implemented by an embodiment 13.

Figure 12:
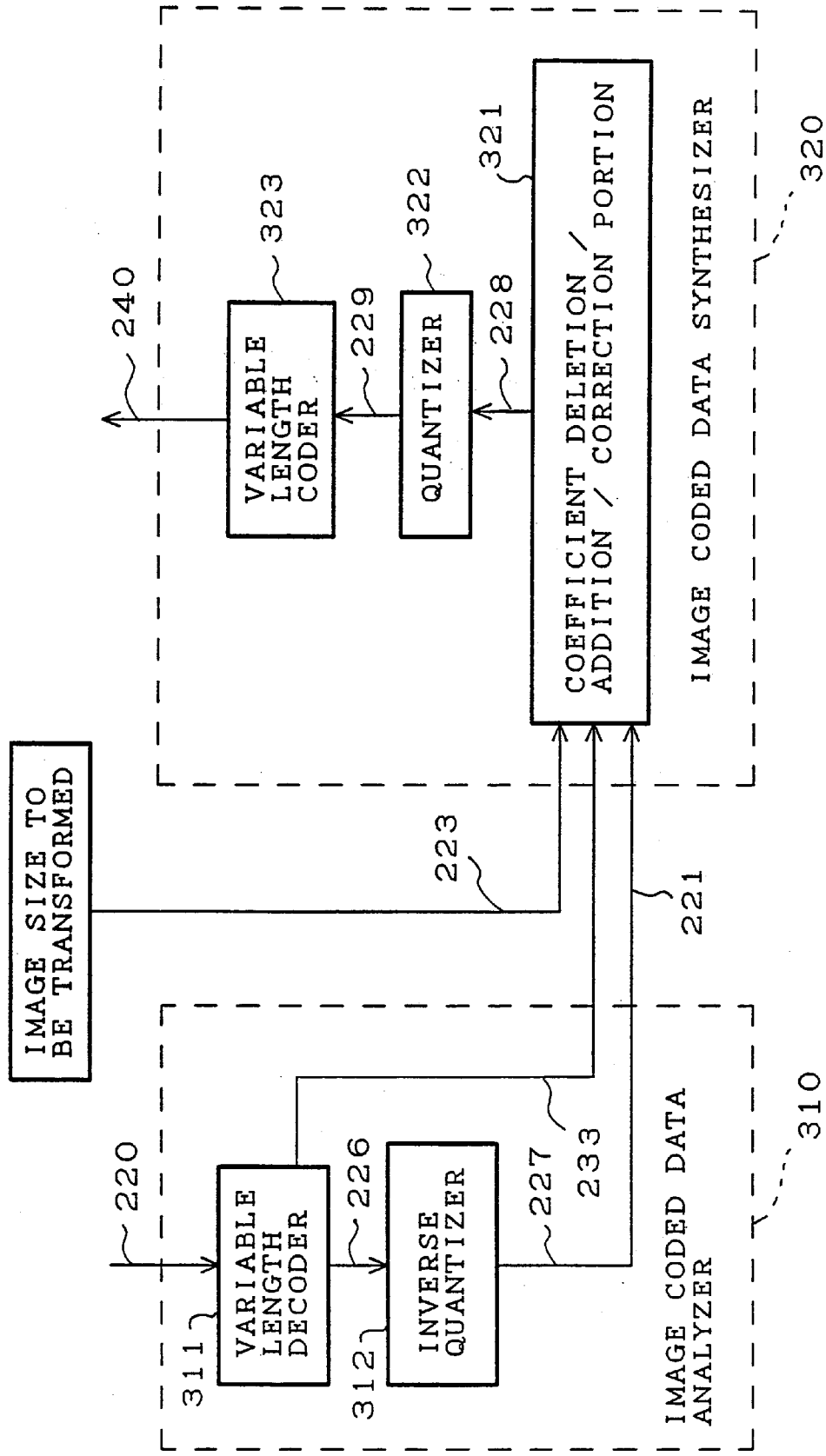
FIG. 12 is a block diagram showing a thirteenth embodiment of an image coded data re-encoding apparatus in accordance with the present invention.

FIG. 12 is a block diagram showing the internal configuration of the image coded data analyzer 310 and image coded data synthesizer 320 of the embodiment 13 of the image coded data re-encoding apparatus 30 in accordance with the present invention. In this figure, the reference numeral 233 designates motion vector information for motion compensation which is output from the variable length decoder 311 in the course of variable length decoding of the first image coded data 220 supplied from the coding processor 40. The remaining portions are designated by the same reference numerals as in FIG. 11, and the description thereof is omitted here. The present embodiment 13 differs from the embodiment 12 in that the variable length decoder 311 produces the motion vector information 233 besides the quantization indices 226, and that the coefficient deletion/addition/correction portion 321 carries out the revision such as the increase or decrease, or correction of the transform coefficients 227 by using the motion vector information 233 besides the image sizes to be transformed which are defined by the information 223 commanding the transform.

Next, the operation will be described.

In the image coded data analyzer 310 as shown in FIG. 12, the variable length decoder 311 decodes the first image coded data 220, supplies the inverse quantizer 312 with the resultant quantization indices 226, and supplies the image coded data synthesizer 320 with the motion vector information 233 which is obtained in the course of the decoding. The inverse quantizer 312 performs the inverse quantization of the quantization indices 226, and transfers the resultant transform coefficients 227 to the image coded data synthesizer 320 as the coded data after signal processing 221. In the image coded data synthesizer 320, on the other hand, the coefficient deletion/addition/correction portion 321 receives the inversely quantized transform coefficients 227 and motion vector information 233, together with the information 223 which commands the transform and defines the image sizes to be transformed. The coefficient deletion/addition/correction portion 321 corrects the dimension of the motion vectors in accordance with the ratio of the image sizes defined by the information 223 commanding the transform. Thus changing the dimension of the motion vectors in accordance with the transform ratio of the image sizes makes it possible to utilize the vectors used before the transform in substantially the same form. Accordingly, retrieval of the motion vectors based on the calculated vectors can improve the retrieval efficiency as compared with original retrieval.

Thus, according to the embodiment 13, since the motion vectors are corrected in accordance with the ratio of image sizes to be transformed, the search efficiency can be improved of the motion vectors in the image coded data after the transform. As a result, the motion compensative search in a narrower range based on the corrected motion vectors can offer a characteristic nearly equivalent to that obtained when the motion compensative search is carried out in a wider range.

Embodiment 14

Figure 13:
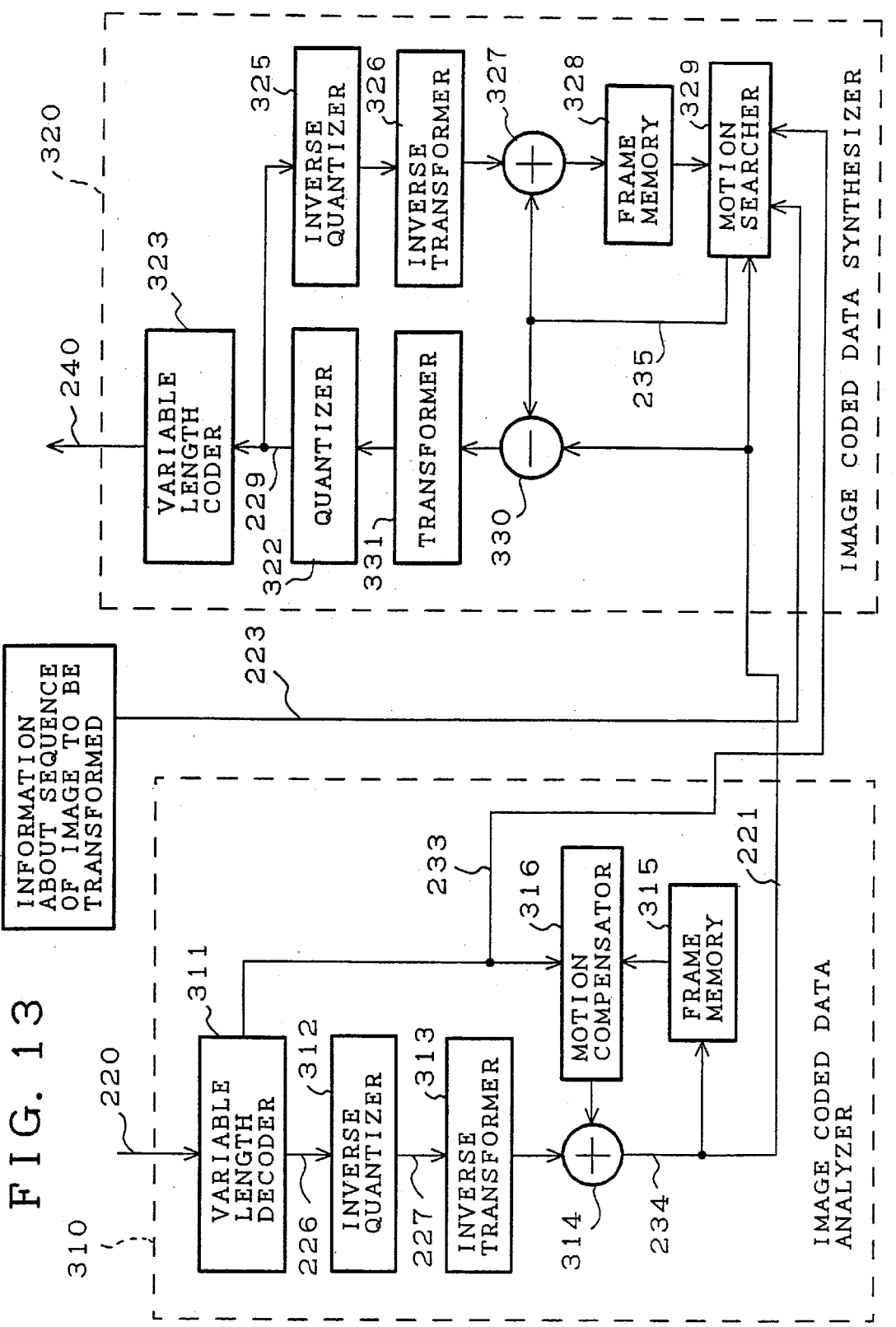
FIG. 13 is a block diagram showing a fourteenth embodiment of an image coded data re-encoding apparatus in accordance with the present invention.

FIG. 13 is a block diagram showing the internal configuration of the image coded data analyzer 310 and image coded data synthesizer 320 of an embodiment 14 of the image coded data re-encoding apparatus 30 in accordance with the present invention, which transforms the sequence of images between the first image coded data 220 and the second image coded data 240, in which like portions are designated by the same reference numerals as in FIG. 12, and the description thereof is omitted here. In the present embodiment 14, the sequence of the images to be transformed is defined by the information 223 commanding the transform.

In the image coded data analyzer 310 in FIG. 13, the reference numeral 313 designates an inverse transformer that carries out inverse transform of the inversely quantized transform coefficients 227 output from the inverse quantizer 312 by applying the inverse DCT operation or the like to the transform coefficients 227, and 314 designates an adder for adding the processing result of the inverse transformer 313 to that of the motion compensator which will be described later. The reference numeral 234 designates a decoded image output from the adder 314 as the coded data after signal processing 221, and 315 designates a frame memory in which the decoded image 234 is stored temporarily. The reference numeral 316 designates the motion compensator which applies the motion compensation to the decoded image one cycle before, which is read out of the frame memory 315, on the basis of the motion vectors 233 generated in the decoding process by the variable length decoder 311, and supplies the processing result to the adder 314.

In the image coded data synthesizer 320, the reference numeral 325 designates an inverse quantizer for carrying out inverse quantization of the quantization indices 229 output from the quantizer 322, 326 designates an inverse transformer for performing the inverse transform of the output of the inverse quantizer 325 by applying the inverse DCT or the like to this output, and 327 designates an adder for adding the processing result of the inverse transformer 326 to a frame image output from a motion searcher which will be described later. The reference numeral 328 designates a frame memory which stores the output of the adder 327 temporarily, and 329 designates a motion searcher. The motion searcher 329, receiving the image data one cycle before which is read out of the frame memory 328, the motion vector information 233 from the image coded data analyzer 310, the decoded image 234 as the coded data after signal processing 221, and the signal 223 which commands the transform and defines the sequence and information of the images to be transformed, estimates the dimension of the motion vectors extracted in response to the sequence information of the images to be transformed, and carries out the motion search on the basis of the estimation result. The reference numeral 235 designates frame images delivered from the motion searcher 329 to the adder 327 and a subtracter 330 for calculating the difference between the decoded image 234 which is supplied from the image coded data analyzer 310 as the coded data after signal processing 221 and the image data 235 output from the motion searcher 329. The reference numeral 331 designates a transformer for applying the transform processing such as DCT operation or the like to the output of the subtracter 330, and for supplying the processing result to the quantizer 322.

Next, the operation will be described.

Let us assume that the sequences are transformed of the image signals included in the first image coded data 220 which is input to the image coded data analyzer 310 and in the second image coded data 240 which is output from the image coded data synthesizer 320, and that the coding processor 40 which generates the first image coded data 220 and the decoding processor 50 which decodes the second image coded data 240 carry out processing based on transform coding including the motion compensative prediction, transform and quantization as shown in FIGS. 2 and 4, respectively. In this case, the image coded data analyzer 310 extracts the motion vectors used in the motion compensation, and the motion searcher 329 estimates the dimension of the motion vectors in response to the sequence information of the images to be transformed. Performing such a search based on the estimated motion vectors when transforming the picture type to be coded, for example, enables the motion search in a narrower range involving a large volume of calculations to keep efficiency equivalent to that of the motion compensative search in a wider range.

In the image coded data analyzer 310 as shown in FIG. 13, the variable length decoder 311 decodes the first image coded data 220, and supplies the resultant quantization indices 226 to the inverse quantizer 312, and the motion vector information 233 obtained in the decoding process to the image coded data synthesizer 320 and the motion compensator 316. The inverse quantizer 312 inversely quantizes the quantization indices 226, and the inverse transformer 313 applies the inverse transform such as inverse DCT operation to the resultant transform coefficients 227 to supply its result to the adder 314. On the other hand, the motion compensator 316 carries out the motion compensation of the decoded image one cycle before which is output from the frame memory 315 in accordance with the motion vector information 233 fed from the variable length decoder 311, and provides the result to the adder 314. The adder 314 adds the frame images fed from the inverse transformer 313 and the motion compensator 316 to generate the decoded image 234, and supplies it to the image coded data synthesizer 320 as the coded data after signal processing 221. Thus, the image coded data analyzer 310 not only performs equivalent operation to the decoding by a common transform coding system with a motion compensation, but also supplies the image coded data synthesizer 320 with the decoded image 234 as the coded data after signal processing 221 and the motion vector information 233 extracted by the variable length decoder 311.

In the image coded data synthesizer 320, on the other hand, the motion searcher 329 receives the decoded image 234 and the motion vector information 233, together with the information 223 which commands the transform and defines the sequence information of the images to be transformed. The motion searcher 329 also receives the image data one cycle before which is read out of the frame memory 328. This image data is generated by inversely quantizing in the inverse quantizer 325 the quantization indices 229 output from the quantizer 322, by applying the inverse transform such as the inverse DCT to the output of the inverse quantizer 325 in the inverse transformer 326, by adding by the adder 327 the processing results in the inverse transformer 326 and the motion searcher 329, and by storing the addition result. The motion searcher 329 not only generates the frame images 235 on the basis of these data to achieve operation equivalent to that of the common transform coding system with motion compensation, but also estimates the motion vectors of the current coded data by using the motion vector information 233 fed from the image coded data analyzer 310, and the sequence information about the images to be transformed, which is defined by the information 223 commanding the transform, thereby carrying out the motion search based on the estimation result. The frame image 235 output from the motion searcher 329 is supplied to the subtracter 330 which calculates the difference between the frame image 235 and the decoded image 234 delivered from the image coded data analyzer 310 as the coded data after signal processing 221. Then, the transformer 331 transforms the output of the subtracter 330 by applying the DCT operation thereto. The quantizer 322 performs the quantization, and the variable length coder 323 carries out coding of the resultant transform coefficients to the second image coded data 240. Thus, the image coded data synthesizer 320 not only performs equivalent operation to the coding in the common transform coding system with the motion compensation by inputting the decoded image 234 and motion vector information 233 from the image coded data analyzer 310, but also estimates in the motion searcher 329 the dimension of the motion vectors extracted in the image coded data analyzer 310 in response to the sequence information of the images to be changed which is provided by the information 223 commanding the transform, thereby performing the motion search based on the estimation result.

Thus, according to the embodiment 14, the delay involved in coding is shortened by performing transform which changes the sequence of the images at reproduction and that of the images after the transform. Furthermore, it can improve the efficiency of coding using the transformed motion vectors by estimating the dimension of the motion vectors in response to the sequence information about the images to be transformed in the processing for changing the sequence of the images to be transformed.

Embodiment 15

Figure 14:
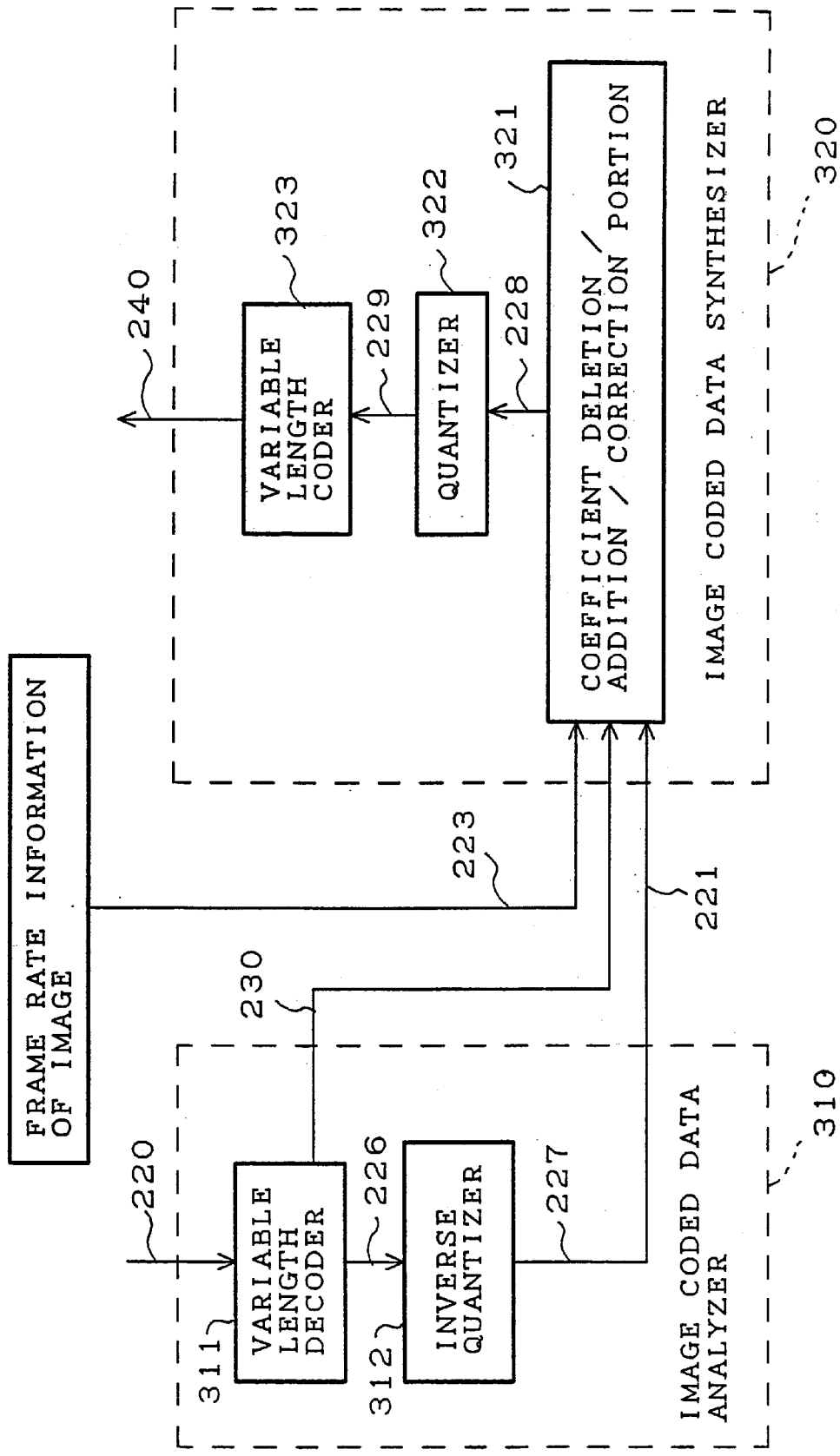
FIG. 14 is a block diagram showing a fifteenth embodiment of an image coded data re-encoding apparatus in accordance with the present invention.

FIG. 14 is a block diagram showing the internal configuration of the image coded data analyzer 310 and image coded data synthesizer 320 of an embodiment 15 of the image coded data re-encoding apparatus 30 in accordance with the present invention, which transforms the number of frames of the image signal included in the first image coded data 220 and that of the image signal included in the second image coded data 240, in which the like portions are designated by the same reference numerals as in FIG. 8, and the description thereof is omitted here. The present embodiment 15 differs from the embodiment 8 in that the information 223 commanding the transform defines the frame rate of the images, and that the coefficient deletion/addition/correction portion 321 deletes or corrects the transform coefficients 227, which are inversely quantized by the inverse quantizer 312, by using the frame rate information of the images based on the information 223 commanding the transform.

Next, the operation will be described.

Let us assume that the transform is carried out between the first image coded data 220 and the second image coded data 240, and that the number of frames associated with the first image coded data 220 differ from that associated with the second image coded data 240, in which each number of frames is defined as that of the decoded image signal per unit time when the first image coded data 220 input to the image coded data analyzer 310 and the second image coded data 240 output from the image coded data synthesizer 320 are decoded into images. When an image coding mode, which is used as information extracted from the first image coded data 220, indicates the image which will not be used for future coding of images, the data of the image is deleted. This enables the transform of the frame rate to be achieved without having substantial effect on the quality of the future images.

In the image coded data analyzer 310 as shown in FIG. 14, the variable length decoder 311 decodes the first image coded data 220, and supplies the inverse quantizer 312 with the resultant quantization indices 226, and the image coded data synthesizer 320 with the coded picture information 230 which is obtained in the course of decoding. The inverse quantizer 312 carries out the inverse quantization of the quantization indices 226, and sends the resultant transform coefficients 227 to the image coded data synthesizer 320 as the coded data after signal processing 221. In the image coded data synthesizer 320, on the other hand, the coefficient deletion/addition/correction portion 321 receives the inversely quantized transform coefficients 227 and the coded picture information 230 together with the information 223 which commands the transform and defines the image frame rate, and decides whether or not these input data indicate the coded picture which will not be used for the prediction in the future coding. If so, the data of the picture is deleted by applying the method of the embodiment 8, thereby achieving the transform of the frame rate equivalently.

Thus, according to the embodiment 15, an advantage is gained that the transform is readily achieved between the television signals of different systems by varying the number of frames between the image signal included in the first image coded data 220 before the transform and that included in the second image coded data 240 after the transform.

Embodiment 16

Figure 15:
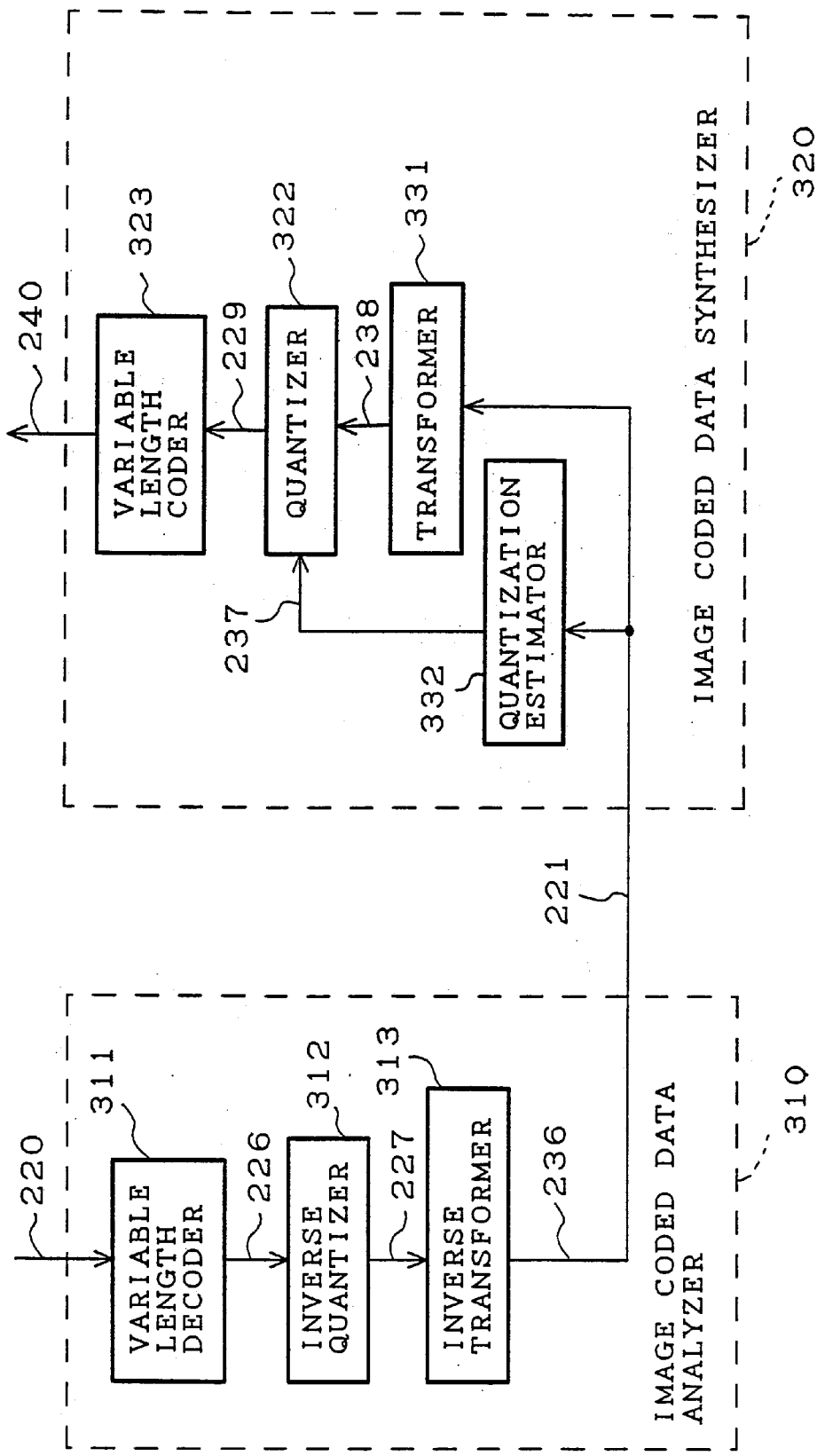
FIG. 15 is a block diagram showing a sixteenth embodiment of an image coded data re-encoding apparatus in accordance with the present invention.
Figure 16:
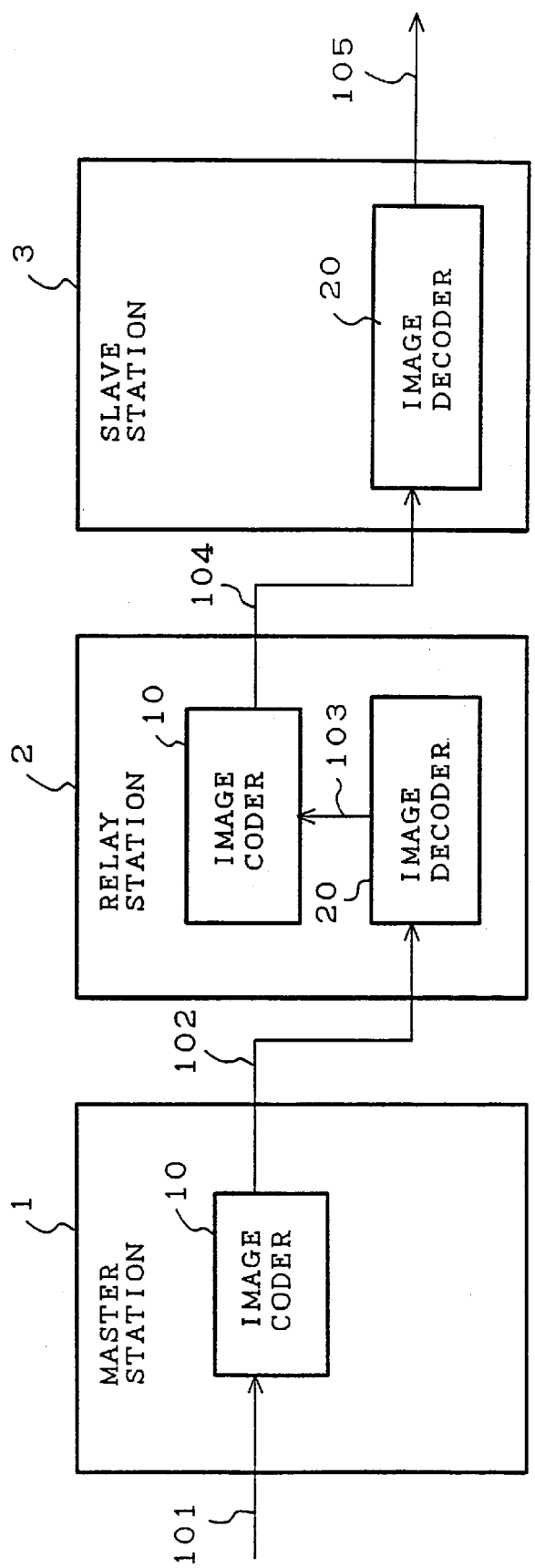
FIG. 16 is a block diagram showing a conventional image coded data re-encoding apparatus.

FIG. 15 is a block diagram showing the internal configuration of the image coded data analyzer 310 and image coded data synthesizer 320 of an embodiment 16 of the image coded data re-encoding apparatus 30 in accordance with the present invention, which estimates the quantization parameters from the decoded images of the first image coded data 220, and used them for the quantization for generating the second image coded data 240, in which the like portions are designated by the same reference numerals as in FIG. 13, and the description thereof is omitted here. In this figure, the reference numeral 236 designates a decoded image the inverse transformer 313 decodes by applying the inverse DCT operation to the transform coefficients 227 output from the inverse quantizer 312. The decoded image 236 is sent to the image coded data synthesizer 320 as the coded data after signal processing 221. The reference numeral 332 designates a quantization estimator which estimates the quantization parameters during the generation of the first image coded data 220 from the decoded image 236 fed as the coded data after signal processing 221, 237 designates the quantization parameter information supplied from the quantization estimator 332 to the quantizer 322, and 238 designates the transform coefficients the transformer 331 generates from the decoded image 236.

Next, the operation will be described.

When transforming the rate of images between the first image coded data 220 and the second image coded data 240, the image coded data analyzer 310 extracts from the first image coded data 220 the quantization parameters in the quantization process, and the image coded data synthesizer 320 carries out the quantization using the quantization parameters. This means that the image coded data analyzer 310 performs the decoding and the image coded data synthesizer 320 carries out the coding. This makes it possible to achieve the highest quality transform when the bit rate and the coding system are each identical before and after the transform. In addition, even if the bit rates differ, optimum transform can be achieved by controlling the quantization parameters in accordance with the ratio of the bit rates.

In the image coded data analyzer 310 as shown in FIG. 15, the variable length decoder 311 carries out the variable length decoding of the first image coded data 220 to generate the quantization indices 226, and the inverse quantizer 312 inversely quantizes them to generate the transform coefficients 227. The inverse transformer 313 applies the inverse DCT operation to the transform coefficients 227 to generate the decoded image 236, and transfers it to the image coded data synthesizer 320 as the coded data after signal processing 221. Thus, the image coded data analyzer 310 performs operation equivalent to common decoding, thereby outputting the decoded image 236 as the coded data after signal processing 221. In the image coded data synthesizer 320, on the other hand, the transformer 331 receives the decoded image 236 sent as the coded data after signal processing 221, and applies the DCT operation to it to generate the transform coefficients 238 which are input to the quantizer 322. The quantization estimator 332 also receives the decoded image 236, estimates the quantization parameters during the generation of the first image coded data 220, and supplies the resultant quantization parameter information 237 to the quantizer 322. The quantizer 322 quantizes the transform coefficients 238 fed from the transformer 331 in response to the quantization parameter information 237 from the quantization estimator 332. Then, the variable length coder 323 carries out coding of the quantization indices 229 to generate and output the second image coded data 240.

Thus, according to the embodiment 16, estimating the quantization parameters from the decoded image 236 enables the image quality associated with the newly generated second image coded data 240 to be improved, thereby offering an advantage of keeping the image quality after the transform in relay transmission. In particular, when the rates before and after the transform are identical, using the estimated quantization parameters enable the image quality to be kept even after repeating a plurality of coding operations. In addition, even if the rates are different before and after the transform, an advantage is gained that optimum transform can be achieved by controlling the quantization parameters in accordance with the ratio of the rates.

Embodiment 17

The foregoing embodiments can offer configuration not only for forming communication images, but also for multi-site image transform systems, or systems for copying image data in storage media.

Furthermore, although the portions playing a major role in the transform, such as the coefficient deletion/addition/correction portion 321, coding parameter correction/transform portion 324 and quantization estimator 332 are placed in the image coded data synthesizer 320, it is not necessary that they are provided in the image coded data synthesizer 320. For example, they may be placed in the image coded data analyzer 310 or in outside independently.

What is claimed is:

1. An image coded data re-encoding apparatus which receives a first image coded data and which generates a second image coded data by performing a digital signal processing on said first image coded data, said first image coded data generated by a coding processor including a transformer, a quantizer, and a variable length coder for coding a digital input image signal, said image coded data re-encoding apparatus comprising:

an image coded data analyzer for generating coded data after signal processing by performing a first digital signal processing on said first image coded data which partially decodes said first image coded data; and an image coded data synthesizer for generating said second image coded data by performing a second digital signal processing on said coded data after signal processing which re-encodes said coded data after signal processing based on multiple signals associated with said first image coded data by using said coded data terminal processing output from said image coded data analyzer and said multiple signals; and said image coded data analyzer decodes said first image coded data by performing said first digital signal processing on said first image coded data to generate decoded image data as said coded data after signal processing, said image coded data re-encoding apparatus further comprises an information extractor/estimator for extracting or estimating said multiple signals needed for said second digital signal processing from said coded data after signal processing generated by said image coded data analyzer, and said image coded data synthesizer generates said second image coded data by performing on said coded data after signal processing said second digital signal processing based on said multiple signals by using said coded data after signal processing output from said image coded data analyzer and said multiple signals output from said information extractor/estimator.

* * * * *

UNITED STATES PATENT AND TRADEMARK OFFICE
CERTIFICATE OF CORRECTION

PATENT NO.    : 6,246,438 B1
DATED         : June 12, 2001
INVENTOR(S)   : Nishikawa, Hirofumi et al.

It is certified that error appears in the above-identified patent and that said Letters Patent is hereby corrected as shown below:

<u>Column 31,</u>
Line 24, claim 1 should read as follows:

1. An image coded data-re-encoding apparatus which receives a first image coded data and which generates a second image coded data by performing a digital signal processing on said first image coded data, said first image coded data generated by a coding processor including a transformer, a quantizer, and a variable length coder for coding a digital input image signal, said image coded data re-encoding apparatus comprising:

an image coded data analyzer for generating coded data after signal processing by performing a first digital signal processing on said first image coded data which partially decodes said first image coded data; and an image coded data synthesizer for generating said second image coded data by performing a second digital signal processing on said coded data after signal processing which re-encodes said coded data after signal processing based on multiple signals associated with said first image coded data by using said coded data after signal processing output from said image coded data analyzer and said multiple signals, said multiple signals including parameters other than DCT coefficients; and said image coded data analyzer decodes said first image coded data by performing said first digital signal processing on said first image coded data to generate decoded image data as said coded data after signal processing, said image coded data re-encoding apparatus further comprises an information extractor/estimator for extracting or estimating said multiple signals needed for said second digital signal processing from said coded data after signal processing generated by said image coded data analyzer, and for outputting said multiple signals obtained by extraction or estimation to said image coded data synthesizer, and

UNITED STATES PATENT AND TRADEMARK OFFICE
CERTIFICATE OF CORRECTION

PATENT NO.    : 6,246,438 B1
DATED         : June 12, 2001
INVENTOR(S)   : Nishikawa, Hirofumi et al.

It is certified that error appears in the above-identified patent and that said Letters Patent is hereby corrected as shown below:

said image coded data synthesizer generates said second image coded data by performing on said coded data after signal processing said second digital signal processing based on said multiple signals by using said coded data after signal processing output from said image coded data analyzer and said multiple signals output from said information extractor/estimator.

Signed and Sealed this

Fourth Day of November, 2003

JAMES E. ROGAN
*Director of the United States Patent and Trademark Office*